US 007582214B2

(12) United States Patent
Brook et al.

(10) Patent No.: US 7,582,214 B2
(45) Date of Patent: Sep. 1, 2009

(54) METHODS FOR FORMING MACROPOROUS MONOLITHIC METHYLSILSESQUIOXANES

(75) Inventors: Michael A. Brook, Ancaster (CA); John D. Brennan, Dundas (CA); Hanjiang Dong, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 24 days.

(21) Appl. No.: 11/425,238

(22) Filed: Jun. 20, 2006

(65) Prior Publication Data

US 2007/0020917 A1      Jan. 25, 2007

Related U.S. Application Data

(60) Provisional application No. 60/691,844, filed on Jun. 20, 2005.

(51) Int. Cl.
  *B01D 15/08*  (2006.01)
  *C08G 77/00*  (2006.01)
(52) U.S. Cl. .............................. 210/656; 528/10; 528/11
(58) Field of Classification Search .................. 438/622
    See application file for complete search history.

(56) References Cited

U.S. PATENT DOCUMENTS

| 4,017,528 | A | * | 4/1977 | Unger et al. ................. 556/457 |
| 5,414,192 | A | * | 5/1995 | Lansbarkis ................... 585/825 |
| 5,449,853 | A | * | 9/1995 | Lansbarkis et al. .......... 585/825 |
| 5,869,152 | A | * | 2/1999 | Colon ........................ 428/34.4 |
| 6,495,649 | B2 | * | 12/2002 | Harada et al. ................. 528/39 |
| 6,548,690 | B2 | * | 4/2003 | Mimoun ...................... 556/453 |
| 7,250,214 | B2 | * | 7/2007 | Walter et al. ................. 428/405 |
| 2003/0150811 | A1 | * | 8/2003 | Walter et al. ................. 210/656 |
| 2007/0135304 | A1 | * | 6/2007 | Walter et al. ................. 502/402 |

FOREIGN PATENT DOCUMENTS

JP       2000186148   A   *   7/2000

OTHER PUBLICATIONS http://www.campbell.edu/faculty/bryan/CHEM334/
CHEM334L%20Handouts/CHEM334L%20Conductivity_2005.
pdf.*
Dong, H., et al., "A New Route to Monolithic Methylsilsesquioxanes: Gelation Behavior of Methyltrimethoxysilane and Morphology of Resulting Methylsilsesquioxanes under One-Step and Two-Step Processing", Chemistry of Materials, 2005, pp. 2807-2816, vol. 17.
Shirtcliffe, N.J., et al., "Intrinsically Superhydrophobic Organosilica Sol-Gel Foams", Langmuir, 2003, pp. 5626-5631, vol. 19.
Kanamori, K., et al., "Structural formation of hybrid siloxane-based polymer monolith in confined spaces", Journal of Separation Science, 2004, pp. 874-886, vol. 27.
Belton, D., et al., "Towards an understanding of (bio)silicification: the role of amino acids and lysine oligomers in silicification", Journal of Materials Chemistry, 2004, pp. 2231-2241, vol. 14.

* cited by examiner

*Primary Examiner*—Randy Gulakowski
*Assistant Examiner*—Robert Loewe
(74) *Attorney, Agent, or Firm*—Rothwell, Figg, Ernst & Manbeck, P.C.

(57) ABSTRACT

The present invention relates to a two-step method of preparing methylsilsequixane (MSQ) materials suitable for chromatographic applications comprising treating a MSQ precursor with a suitable acid followed by treatment with a suitable base under conditions to form a MSQ monolith suitable for chromatographic applications.

15 Claims, 21 Drawing Sheets

(a)　　　　　　　　　　　　　　(b)

(c)　　　　　　　　　　　　　　(d)

METHODS FOR FORMING MACROPOROUS MONOLITHIC METHYLSILSESQUIOXANES

This application claims the benefit under 35 USC §119(e) from U.S. Provisional patent application Ser. No. 60/691,844, filed Jun. 20, 2005.

FIELD OF THE INVENTION

The present invention relates to methods for forming macroporous monolithic methylsilsesquioxane (MSQ) materials, the properties of the resulting materials, and uses of such materials as chromatographic stationary phases. Specifically, the present invention describes a two-step acid catalyzed hydrolysis/base catalyzed condensation process for forming MSQ materials with a wide range of morphologies, various shrinkage and springback (shrinkage/expansion) properties, and utility as monolithic chromatographic stationary phases that show stability to high pH mobile phases.

BACKGROUND OF THE INVENTION

Methylsilsesquioxanes (MSQs) are synthetic materials with a empirical formula of $(CH_3SiO_{3/2})_n$. They are generally prepared by hydrolysis and condensation of precursors such as $CH_3SiX_3$, where X is generally Cl, $OCH_3$ (methyltrimethoxysilane (MTMS)) or $OC_2H_5$ (methyltriethoxysilane (MTES)).[1-3] They have long been used in a wide variety of applications such as insulating coatings for optical and electrical devices,[1] and as additive powders to materials such as cosmetics, polypropylene films, and methacrylic resins.[2] Recently, MSQ has been used as a low k dielectric material in the semiconductor industry to minimize resistance-capacitance delay.[4] The newest and potentially largest-scale application of MSQ is as monolithic columns for normal and reversed-phase chromatography. Nakanishi et al. showed that bicontinuous macroporous MSQ-based columns prepared under highly acidic conditions have no shrinkage in capillaries up to an i.d. of 0.5 mm and a theoretical plate number as large as 100,000 when operated in the normal phase mode.[5] MSQ displays exceptional properties toward polar solvents and has a water contact angle larger than 150°,[6] and thus so-called "superhydrophobic" materials have received a lot of attention by many research groups recently.[7] MSQ is also the primary material used for entrapment of lipases as biocatalysts, due to its hydrophobicity. In this application, MTMS is often co-condensed with tetraethoxysilane (TEOS) and tetramethoxysilane (TMOS) to form hybrid matrixes.[8]

Previous studies have greatly increased understanding of the sol-gel chemistry of MTMS[9-11] and MTES,[12] and the structure-property relationships of MSQ.[4,6,11,13] Most of these investigations are focused on how to synthesize stable MSQ sols[11] and/or on the properties of dense or slightly porous thin films.[6,11] Generally speaking, gelation of MTMS and MTES is much more difficult than TEOS and TMOS due to extensive cyclization under acidic conditions,[9,12] premature phase separation over a broad pH range,[14] and fewer functional groups for cross-linking. Loy and co-workers concluded that it was not possible to prepare MSQ gels except at extremely high or low pH regardless of monomer or water concentration.[15] Consequently, there are only a few reports that describe porous MSQ gels[6,14] and many of their properties, such as pH stability and morphology, are still elusive. Also, processing at extreme pH values makes it difficult to employ pure MSQ materials for applications such as protein entrapment.

There remains a need for improved processing methods to form monolithic MSQ materials that will provide better control over the morphology and shrinkage properties of the final material. There is also a need to examine how such materials perform as chromatographic stationary phases and as supports for protein entrapment.

SUMMARY OF THE INVENTION

The present invention relates to new two-step processing conditions that can be used to control the final morphology of the MSQ material. Based on a detailed examination of the hydrolysis/condensation mechanisms of MTMS, it was determined that, to obtaining self-supporting monoliths, it is desirable to develop processing conditions that allow the time required for gelation to be less than or equal to the time required for phase separation. Under one-step processing conditions there are limited regions where this situation will hold. However, under two-step processing conditions involving an initial acid catalysis step followed by base catalyzed condensation (B2 method), it is possible to separate the hydrolysis and condensation steps to a large degree, and to individually tune each step to allow a wider range of conditions for the formation of gels. The present data show that use of the B2 method provides opportunities to control gel morphology, which are beneficial for the preparation of porous monolithic MSQ materials that can be used for chromatographic applications using basic mobile phases and entrapment of hydrophobic enzymes such as lipase, tyrosinase or cytochrome P450 enzymes.

The present invention relates to a number of new processing methods that all involve the use of an initial acid catalyzed hydrolysis step followed by a base catalyzed condensation step. Specific methods include: 1) manipulation of the concentration of the initial acid catalyst to alter morphology of the material; 2) manipulation of the duration of the acidic step to provide fine control over final morphology; 3) manipulation of MTMS:water ratios in the two step method to control shrinkage and springback behaviour in MSQ materials.

Accordingly, the present invention relates to a two-step method of preparing MSQ materials suitable for chromatographic applications comprising treating a MSQ precursor with a suitable acid followed by treatment with a suitable base under conditions to form a MSQ monolith suitable for chromatographic applications.

The present invention also includes a method of controlling the morphology of MSQ materials comprising treating a MSQ precursor with a suitable acid followed by treatment with a suitable base under conditions to form a MSQ monolith suitable for chromatographic applications, wherein the morphology of the MSQ monolith is controlled by one or more reaction conditions selected from the group consisting of:
  (a) acid concentration;
  (b) time of acid treatment; and
  (c) total concentration of water.

The present invention also relates to the use of MSQ materials formed by the two-step process for the formation of chromatographic stationary phases and for the entrapment of hydrophobic proteins to be used in, for example, but not limited to, catalysis, solid phase extraction and biotechnology.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will now be described in relation to the drawings in which.

DETAILED DESCRIPTION OF THE INVENTION

Figure 1:
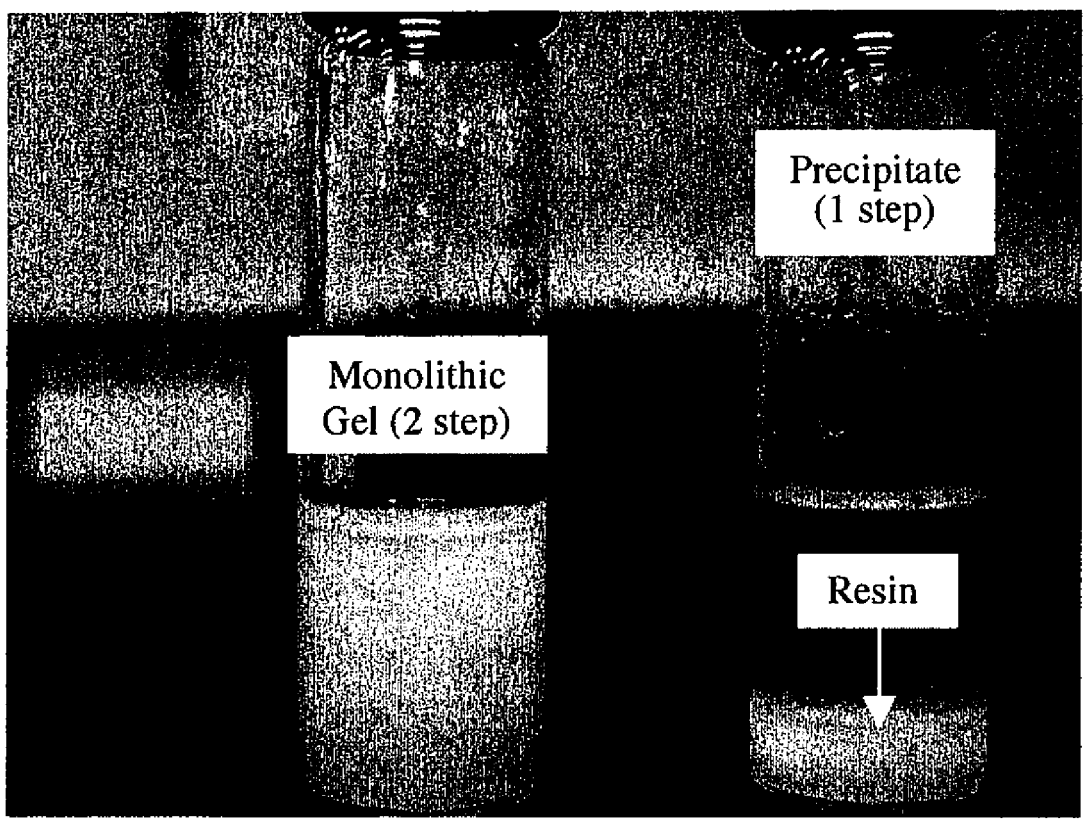
FIG. 1 shows optical images of the different forms of MSQ obtained using one-step and two-step processing conditions.

The present invention relates to a number of new processing methods to prepare MSQ materials that all involve the use of an initial acid catalyzed hydrolysis step followed by a base catalyzed condensation step. Specific methods include: 1) manipulation of the concentration of the initial acid catalyst to alter morphology of the material; 2) manipulation of the duration of the acidic step to provide fine control over final morphology; 3) manipulation of MTMS:water ratios in the two step method to control shrinkage and springback behaviour in MSQ materials.

Accordingly, the present invention relates to a two-step method of preparing MSQ materials suitable for chromatographic applications comprising treating a MSQ precursor with a suitable acid followed by treatment with a suitable base under conditions to form a MSQ monolith suitable for chromatographic applications.

The MSQ precursor may be any compound that may be hydrolyzed, then condensed to form MSQ materials. Such compounds will have the general formula Me-Si—(OR)$_3$, wherein R is a group that may be hydrolyzed under acidic or basic conditions to provide free OH groups that may be polycondensed to form MSQ materials. In an embodiment of the invention, R is methyl or ethyl, suitably methyl.

The suitable acid may be any acid that will hydrolyze the MSQ precursor under the reaction conditions described herein. In an embodiment of the invention, the acid is selected from, for example, hydrochloric acid, nitric acid, sulphuric acid, hydrobromic acid and phosphoric acid. Suitably the acid is hydrochloric acid.

The suitable base may be any base that will effect the polycondensation of the hydrolyzed precursor under the reaction conditions described herein. In an embodiment of the invention, the base is selected from, for example, ammonia, ammonium hydroxide, potassium hydroxide, sodium hydroxide, lithium hydroxide, calcium hydroxide, magnesium hydroxide and barium hydroxide. Suitably the base is ammonium hydroxide.

The conditions to form a MSQ monolith suitable for chromatographic applications generally include the use of an alcoholic, suitably ethanolic, solution of the MSQ precursor. The mole ratio of precursor to solvent, denoted as R, may suitably be in the range of about 1:2 to 1:8, suitably about 1:4. The precursor solution may then be treated with, for example, an aqueous solution of the acid. As described in greater detail hereinbelow, the concentration of the acid and the duration of acid treatment can be varied to control the morphology of the resulting MSQ material. In an embodiment of the invention the concentration of the acid solution may be in the range of about 0.01 M to about 1 M and the precursor solution may be treated with the acid for a time period of about 2 hours to about 6 hours, depending on the concentration of acid, suitably about 2 hours to about 5 hours, more suitably about 2.5 hours to about 4.5 hours using 0.1 M HCl. Once the precursor has reacted with the acid for the desired period of time, an aqueous solution of the base may then be added to promote the polycondensation reaction. The concentration of base may be about 0.1 M to about 3 M, suitably about 1 M to about 2 M, but in any case should be sufficient to raise the pH above the IEP of the silanol groups in MSQ. Again, as described in more detail hereinbelow, the mole ratio of precursor to total water (sum of aqueous acid and aqueous base), denoted as r, may be varied to control the morphology, in particular the shrinkage and springback characteristics, of the resulting MSQ material. In an embodiment of the invention r may be in the range of about 2 to about 12. The method of the invention may be carried out at about 0 to about 50° C., suitably at 20±1° C.

In general, the conditions to form a MSQ monolith suitable for chromatographic applications are those which provide a gelation time that is approximately equal to or less than the phase separation time. Specifically, the difference in gelation time ($t_g$) and phase separation time ($t_{ps}$) should be in the range of $t_g-t_{ps}$=0-200 min, suitably 0-20 min, most suitably 4-10 min.

The term "gelation time" as used herein refers to the time it takes for the reaction mixture to lose flow as measured from the time when the base is added.

The term "phase separation time" as used herein refers to the time it takes for the reaction mixture to phase separate, as evidenced by the appearance of opaqueness, and as measured from the time when the base is added.

By "suitable for chromatographic applications" it is meant that the material is, ideally, a self-supporting monolith comprising bicontinuous meso- and macroporous morphology which simultaneously reduces back pressure and increases surface area for chromatographic applications. It is also desirable for the material to show reduced shrinkage properties so that when prepared inside a column, for example a capillary column, the monolith does not pull back from the sides of the column during drying and aging.

The present invention also includes a method of controlling the morphology of MSQ materials comprising treating a MSQ precursor with a suitable acid followed by treatment with a suitable base under conditions to form a MSQ monolith suitable for chromatographic applications, wherein the morphology of the MSQ monolith is controlled by one or more reaction conditions selected from the group consisting of:
  (a) acid concentration;
  (b) time of acid treatment; and
  (c) total concentration of water.

The term "morphology" as used herein refers to all physical characteristics of the MSQ materials, including porosity, shrinkage and springback. Springback refers to the process of shrinkage of a sol-gel followed by expansion after drying.

The present inventors were the first to observe that the concentration of the acid, and therefore the pH of the solution, used in the initial hydrolysis step, has an effect on the morphology of the resulting MSQ material. Accordingly, a person skilled in the art can adjust the concentration of the acid to obtain a MSQ material having the desired characteristics for their specific application. As stated above, to obtain a MSQ monolith suitable for chromatography, it is desirable to adjust the reaction conditions so that the gelation time is equal to or less than the phase transition time. In embodiments of the invention, the concentration of the acid solution may be in the range of about 0.01 M to about 0.1 M.

The present inventors were also the first to observe that time of the acid treatment used in the initial hydrolysis step has an effect on the morphology of the resulting MSQ material. Accordingly, a person skilled in the art can adjust the acid treatment time to obtain a MSQ material having the desired characteristics for their specific application. In particular, it has been found that this reaction variable can be used to fine-tune the morphology of the MSQ material. To adjust the reaction conditions so that the gelation time is equal to or less than the phase transition time, it is an embodiment of the invention to treat the precursor solution with the acid for a time period of about 2 hours to about 6 hours, suitably about 2 hours to about 5 hours, more suitably about 2.5 hours to about 4.5 hours.

Finally, the present inventors were the first to observe that the total concentration of water used in the method of the invention can be varied to control the morphology of the resulting MSQ materials. The total concentration of water is the mole ratio of precursor to total water (sum of aqueous acid and aqueous base), denoted as r. In particular, this reaction variable has been found to effect the shrinkage and springback characteristics of the resulting MSQ material. Accordingly, a person skilled in the art can adjust r to obtain a MSQ material having the desired characteristics for their specific application. In an embodiment of the invention, to obtain a material that is suitable for chromatographic applications, r may be in the range of about 2 to about 12.

The MSQ monoliths prepared using the method of the invention are especially useful in chromatographic applications. For the preparation of a chromatographic column, the final reaction mixture may be loaded into a chromatographic column before gelation and phase transition occur. Suitably, the column may be treated to remove solvents and to densify the MSQ material after the reaction mixture is placed inside. Such treatment may include, for example, heating to a temperature of greater than 100° C. for a period of over an hour, suitably heating to a temperature of 300-400° C. for a period of 6-8 hours.

In embodiments of the invention the chromatographic column is a capillary column. Conventional capillary columns comprise a cylindrical article having an inner wall and an outer wall and involve a stationary phase permanently positioned within a circular cross-section tube having inner diameters ranging from 10 µm to 1000 µm. The tube wall may be made of glass, metal, plastic and other materials. When the tube wall is made of glass, the wall of the capillary possesses terminal Si—OH groups which can undergo a condensation reaction with terminal Si—OH or Si—OR groups on the silica monolith to produce a covalent "Si—O—Si" linkage between the monolith and the capillary wall. This provides a column with structural integrity that maintains the monolith within the column. Due to the small dimensions of a capillary column, the reaction solution may be introduced into the capillary by the application of a modest vacuum.

In further embodiments of the invention, the MSQ material prepared using the method of the invention is further derivatized to allow tailoring of the material for a variety of chromatographic separations. It should be apparent to those skilled in the art that a variety of modifications can be made to the material to effect separations using many types of interactions. For example, the MSQ material may be derivatized with a suitable organosilane reagent to modify the surface properties of the pores in the column. Alternatively, the silica skeleton itself may be derivatized by reacting the Si—OH or Si—OR groups on the silica with reagents that convert these functionalities to surface linkages to other organic groups such as alkyls, aryls or functional organic groups (e.g. carboxylates or amines). In still further embodiments, other organic groups may include chiral molecules that facilitate the separation of chiral compounds. These derivatizations are known in the art and are included within the scope of the present invention.

The present invention also includes chromatographic columns comprising the MSQ materials prepared as described herein, as well as chromatographic systems comprising the columns which are used for the separation of analytes.

The present invention also relates to the use of MSQ materials formed by the two-step process for the formation of chromatographic stationary phases and for the entrapment of hydrophobic proteins to be used in, for example, but not limited to, catalysis, solid phase extraction and biotechnology.

Accordingly, the present invention includes a method of separating one or more compounds from a mixture comprising applying the mixture to a chromatographic column comprising a MSQ material prepared using a method of the invention and separating the one or more compounds.

In addition, the invention includes the use of a MSQ materials prepared using a method of the invention and comprising an active biological substance entrapped therein, as chromatographic columns, biosensors, immobilized enzymes or as affinity chromatography supports. Therefore, the present invention relates to the use of a MSQ material comprising an active biological substance entrapped therein to quantitatively or qualitatively detect a test substance that reacts with, binds to and/or whose reaction is catalyzed by said encapsulated active biological substance, and wherein said MSQ material is prepared using a method of the invention.

Also included is a method for the quantitative or qualitative detection of a test substance that reacts with, binds to and/or whose reaction is catalyzed by an active biological substance, wherein said biological substance is encapsulated within a MSQ material, and wherein said MSQ material is prepared using a method of the invention. The quantitative/qualitative method comprises (a) obtaining a MSQ material comprising said active biological substance entrapped within a porous, MSQ material prepared using the method of the invention; (b) bringing said biological-substance-comprising MSQ material into contact with a gas or aqueous solution comprising the test substance; and (c) quantitatively or qualitatively detecting, observing or measuring the change in one or more characteristics in the biological substance entrapped within the MSQ material or, alternatively, quantitatively or qualitatively detecting, observing or measuring the change in one or more characteristics in the test substance.

In particular, the invention includes a method, wherein the change in one or more characteristics of the entrapped biological substance is qualitatively or quantitatively measured by spectroscopy, utilizing one or more techniques selected from the group consisting of UV, IR, visible light, fluorescence, luminescence, absorption, emission, excitation and reflection.

The details of each of the methods and applications are presented below in the following non-limiting examples:

EXAMPLES

Example 1

Effect of Concentration of Acidic step

Chemicals

Reagent grade methyltrimethoxysilane and tetramethoxysilane, poly(ethylene oxide) (PEO) with an average molecular weight of 10,000, urea, acetone-d6, tetramethylsilane (TMS), chromium (III) acetylacetonate, ammonium hydroxide ($NH_4OH$), acetic acid, hydrochloric acid (HCl) and absolute ethanol (EtOH) were purchased from Aldrich (Canada). All reagents were used as received. All water was obtained from a Milli-Q Synthesis A10 water purification system.

Procedures

Preparation of MSQ materials: MSQ materials were prepared in EtOH solvent by two separate methods. In the first method, denoted the one-step method, MTMS hydrolysis and condensation proceeded at a single catalyst concentration using acid, water or base as the catalyst, to achieve conditions where the pH was below, near or above the isoelectric point (IEP) of the silanol groups, respectively. Using the one-step method, parameters that were fixed included the molar ratio of $MTMS:H_2O:EtOH$, and the processing temperature, while parameters that were varied included concentration of catalyst and type of catalyst (acid or base). In the second method, denoted as the two-step or B2 method, MTMS was initially reacted under acidic conditions for a set period of time (1 h), after which base was added to the solution to bring the pH above the IEP of the silanol groups. In the B2 method, the $MTMS:H_2O:EtOH$ ratio, processing temperature, duration of the acid catalysis step and the concentration of base added were held constant, while the concentration of acid used in the first step was varied. All samples were aged at room temperature (~19° C.) for 1 week in their mother liquor prior to testing. Drying of samples was done at room temperature for 2 days and then at 120° C. for 1 day, unless otherwise stated. In cases where gels were formed, the gelation time was determined as the time when the solution would not flow when the container was turned on its side.[14] For gels prepared by the one-step method, the gel time is taken from the point where all components are mixed, while for the B2 method the gel time is taken from the point where base was added.

Table 1 shows the specific conditions employed to create the various MSQ materials examined in this work. In all cases, MSQs were prepared by first mixing MTMS and EtOH at a molar ratio of 1:4 (R value of 4) to a total volume of 3.13 mL in closed containers at room temperature (19° C.). In the one-step method, pure water or water containing predetermined concentrations of catalysts (HCl or $NH_4OH$), as noted in Table 1, was added to the silane solution to achieve a $MTMS:H_2O$ molar ratio of 1:4 (r value of 4), and the samples were then stirred for 1 min. As an example, for Sample 1, 1.0 mL of MTMS, 1.63 mL of EtOH and 0.5 mL of 1.0 M HCl were mixed together and stirred for 1 min and left to stand for at 19° C. For the two-step method, the MTMS:EtOH solution (see above) was mixed first with acid and then with base at the concentrations shown in Table 1, with the molar ratios of acidic water (HCl) and basic water ($NH_4OH$) to MTMS set to 2 and 2, respectively. As an example, for Sample 9, 1.0 mL of MTMS, 1.63 mL of EtOH and 0.25 mL of 0.01 M HCl were mixed together and stirred for 1 min and left to stand for 1 h at 19° C. A volume of 0.25 mL of 1.0 M $NH_4OH$ was then added, the sample was stirred for 1 min and the sample was then left to gel.

For comparison of the pH stability of MSQ and silica gels, silica gels were also prepared using conditions identical to those employed by Tanaka et al. to produce capillary columns.[16] Briefly, 1 mL of TMOS, 0.225 g of urea, 0.22 g of PEO and 2.5 mL of 1 M acetic acid were sonicated together for 30 min in ice water, after which the solution temperature was raised to 40° C. Samples gelled after ~2 h. Silica materials were further aged at 40° C. for 1 day and then dried at 120° C. for at least 2 h prior to testing. For stability testing, both MSQ and silica gels were incubated in basic solution, using 7 days incubation in 1 M $NH_4OH$ for MSQ, and 2 days incubation in 0.1 M $NH_4OH$ for silica, after which the morphology of the materials was examined using the $N_2$ sorption method outlined below.

Characterization of MSQ Sols and Gels: Proton decoupled solution state $^{29}Si$ NMR spectra were obtained for the supernatants present above various samples using a Bruker DRX 500 spectrometer using a 5 mm broadband probe at 99.3 MHz. An ambient temperature of ~20° C. was fixed during measurements. Chromium (III) acetylacetonate (1% (w/w)) was added to reduce the long delay time due to the long spin-lattice relaxation time of the silicon atoms. Between 4000 and 5000 transients were collected using a 45° pulse and delay time of 5 s. $^1$H broad-band decoupling was set only during data acquisition to suppress negative nuclear Overhauser effects. All the chemical shifts are referenced to external TMS. Attenuated total reflection FTIR measurements were obtained for precipitates, resins and gels using a Nicolet 470 instrument. Powdered samples were placed on a silicon ATR crystal and irradiated at a 45° angle with respect to the surface normal. Spectra were obtained using a resolution of 2 cm$^{-1}$ and 32 scans were averaged.

Porosity measurements were performed by nitrogen sorption porosimetry using a Quantachrome Nova 2000. All samples were degassed at 200° C. for at least 10 h before measurement. The specific surface area (7 points, 0.025<p/p$_0$<0.35) and pore size distribution were calculated using the multi-point BET equation and BJH (Barrett, Joyner and Halenda) model,[17] respectively, using a 1 min equilibration time between points. The total pore volume was estimated at a pressure close to p/p$_0$=1. Images of gels were also obtained using a Philips 515 scanning electron microscope (SEM) at an operating voltage of 10 kV. The surfaces were previously sputter-coated with gold to avoid charging effects during observation.

Results

As noted above, silsesquioxane samples were prepared by two different processes. In the one-step method, MTMS hydrolysis and condensation proceeded at a single catalyst concentration using either acid, water or base as the catalyst, to achieve conditions where the pH was below, near or above the isoelectric point (IEP) of the silanol groups, respectively. In the two-step method, MTMS was initially reacted under acidic conditions for a set period of time, after which base was added to the solution to bring the pH above the (IEP) of the silanol groups.

Depending on the processing condition used, a range of different MSQ materials were obtained. MSQ products are divided into the following categories: precipitates, resins, gels, and homogeneous solutions, images of which are shown in FIG. 1. Precipitates are insoluble oligomers that are the first species to precipitate from the solution, and usually stick to the sides of the containers while stirring. Resins are macroscopically phase-separated polymers that sink to the bottom of the containers. Gels refer to self-supporting monoliths which may be either translucent or opaque, while homogenous solutions are optically transparent liquids with no evidence of solids present.

Figure 2:
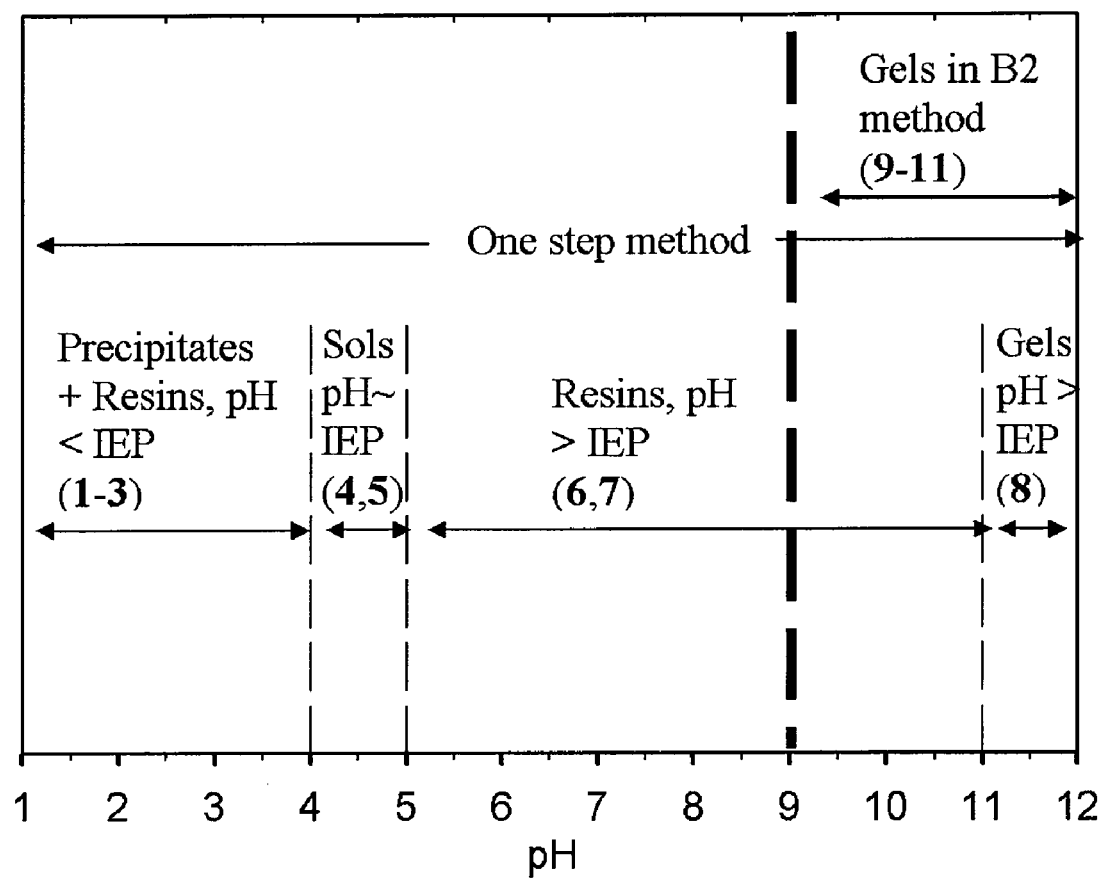
FIG. 2 shows a schematic diagram showing the conditions used to prepare different MSQ based materials under one-step and two-step processes. The numbers in boldface refer to the sample numbers outlined in Table 1.

FIG. 2 shows a schematic of the relationship between the processing conditions used and the resulting materials obtained. In the case of one-step processing, the x-axis shows the calculated pH of the solution based on the initial concentration of acid or based used, assuming that the organic solvent and reaction products do not influence the sample volume or catalyst pK$_a$. For two-step processing, the pH refers to that of the solution after the addition of base, and is based on the same assumptions. In general, the diagram shows that under one-step processing conditions, precipitates and resins form at low pH values (pH<IEP), homogenous solutions form when pH=IEP, resins are again formed at near neutral conditions with pH>IEP, while gels can form above pH 10. In the two-step method, gels are formed when the final pH is basic (in past experience, pH values as low as 9), although, as noted below, the morphology of such gels is pH dependent. It should be noted the pH ranges shown are dependent on the values of R and r, and in this case refer to R=4 and r=4.

One-step Processing

In the one-step method, many parameters such as the precursor, pH, type and concentration of catalysts and solvents, concentration of water, and temperature can influence the sol-gel processing of silicon alkoxides. In this report, EtOH is used as the solvent and set R (ratio of MTMS to EtOH) and total r (ratio of MTMS to water, including water from both HCl and NH$_4$OH additions) equal to 4 and vary only the concentration and type of catalyst (Table 1). Thus, this study is focused on the effect of pH in the one-step process.

Samples 1 to 3 (prepared under acidic conditions and pH<IEP of MSQ, FIG. 2) first formed transparent precipitates followed by relatively dense resins (i.e., there is no observable porosity in either BET or SEM experiments), which macroscopically phase-separated onto the bottom of the reaction vessel. Samples 4 and 5 (prepared under weakly acidic and neutral conditions, pH≈IEP)[18] remain as sols and show no visible change over a period of at least 6 months. Samples 6 and 7 (prepared under basic conditions, pH>IEP of MSQ) generate only dense resins similar to samples 1 to 3. Sample 8 (prepared under strongly basic conditions) becomes a porous monolithic gel.

The results obtained using the one-step method are in general agreement with Loy and co-workers's observation that it is not possible to prepare MSQ gels except at high or low pH regardless of monomer or water concentration (note: the reaction below pH 1 was note examined, and gels were not seen under the conditions used in the present study).[15] It must be pointed out that Loy and co-workers used methanol (MeOH) instead of EtOH as the solvent. In fact, EtOH is more than a solvent, which is especially true in the presence of an acid. This is because hydrolysis is reversible under acidic conditions and thus EtOH reacts with Si—OH and/or Si—OCH$_3$ to become Si—OC$_2$H$_5$.[9] EtOH is also larger and more viscous than MeOH. As a result, the rate of polycondensation of MTMS in EtOH falls in-between the rates in MTMS and MTES in their respective solvents MeOH and EtOH. As a result, the solvent is of particular importance in determining whether MTMS generates gels. This may explain why no gel was obtained under the present conditions even though a concentration of HCl as high as 1 M was used. It should be noted that the time required for the appearance of precipitates, resins, and gels becomes shorter as the pH tends toward highly acidic or highly basic conditions. For example, precipitates appear in 1.8 h in sample 1, while their appearance requires 170 h in sample 3.

While not wishing to be limited by theory, the reasons for the failure to form MSQ gels under one-step conditions are likely related to the intrinsic fact that MTMS has only three functional groups for cross-linking, and the conformational difficulty in getting all three groups to participate in the network. It is well established that bis-silane monomers with two triethoxysilyl groups (six functional groups per molecule) become gels much faster than TEOS (four functional groups), indicating the importance of the number of functional groups on gelation behaviour.[19] One of the most important parameters, aside from the precursor, that influences the sol-gel process is the catalyst, and especially the pH.[15] The rate coefficient of condensation is lowest when pH=IEP,[20] where the concentration of either the protonated silanol or the deprotonated silanol lies in a minimum. This is because the reaction mechanism changes from the attack of the neutral silanol on the protonated silanol (pH<IEP) to the attack of the deprotonated silanol on the neutral silanol (pH>IEP) (limited to water-producing condensation) as shown below.[18].

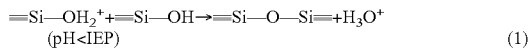

$$\equiv Si-OH_2^+ + \equiv Si-OH \rightarrow \equiv Si-O-Si \equiv + H_3O^+ \quad (1)$$
$$(pH<IEP)$$

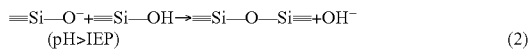

$$\equiv Si-O^- + \equiv Si-OH \rightarrow \equiv Si-O-Si \equiv + OH^- \quad (2)$$
$$(pH>IEP)$$

No data is available for the IEP of the MTMS-derived silanol. For the related trifunctional compound γ-glycidoxypropylsilanetriol in buffered $D_2O$ solutions, Pohl and Osterholtz observed a minimum dimerization rate at pD 4.5.[20] Recently, in the study of the effect of pH on the gelation time of hexylene-bridged alkoxysilanes $((EtO_3)Si(CH_2)_6Si(OEt)_3)$, Loy et al. found that the maximum gelation time occurs at pH 4.5.[15] Since the alkoxy groups on these precursors have one Si—C and three Si—O bonds, as does MTMS, the inductive effects on the silicon sites should be comparable, leading to a similar IEP for hydrolyzed MTMS. This IEP value is close to the pH used to form samples 4 and 5, where condensation was observed to be slowest. This analysis helps to rationalize why there is no visible change in these samples for up to 6 months. This also explains why, regardless of the sol-gel products (precipitates, resins, and gels), the time at which they form decreases at pH values both above and below the IEP, in agreement with the kinetic profile shown in reference 20.

Precipitates: Knowledge about the nature of sol-gel chemistry of silicon alkoxides in the presence of an acid has been greatly improved due to the advent of high-field $^{29}$Si NMR, which allow many condensation species to be monitored in real time.[21] It is well-known that cyclization[9,12,15,21] is an integral part of the sol-gel polymerization of monomers with two or more functional groups, although this is probably less significant with bis(trialkoxysily)alkanes type precursors.[22] In fact, intramolecular condensation can effectively compete and even dominate over intermolecular condensation in these latter systems.

Figure 3:
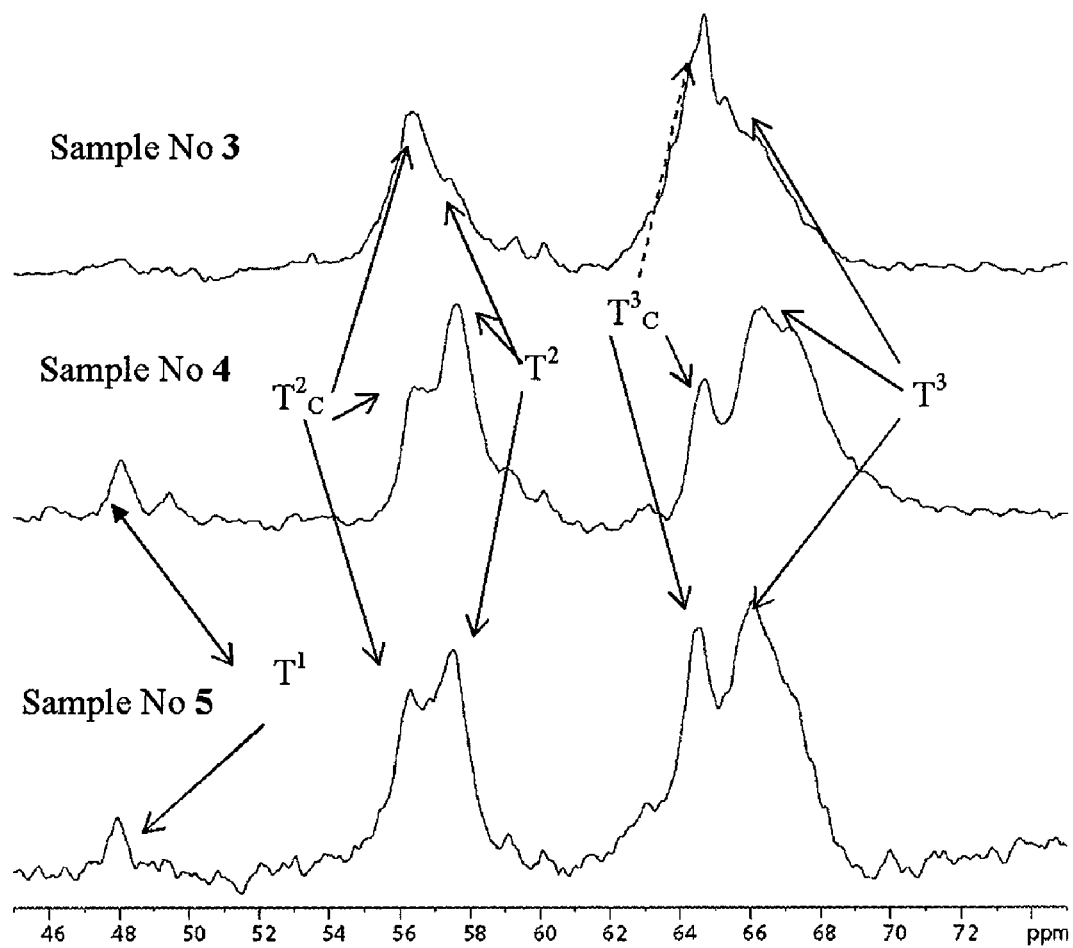
FIG. 3 shows $^{29}$Si NMR solution spectra of the supernatants of sample 3 at 30 days, 4 at 40 days, and 5 at 41 days.

FIG. 3 shows the $^{29}$Si NMR spectrum of the supernatants from samples 3, 4, and 5 at reaction times of 30, 40, and 41 days, respectively. Samples 4 and 5 remain as sols, while sample 3 shows only a minor amount of precipitate. In FIG. 3, T represents a tri-functional silicon while the superscripts 1, 2, and 3 represent the number of siloxane bridges connected to the silicon site (connectivity), and the subscripts t and c indicate the total silicon sites of a specific connectivity and a cyclic silicon site, respectively. That is, $T^2_t = T^2_c + T^2$. Peak assignments are based on reference 9. The degree of condensation (DC) is calculated with the following formula.

$$DC = (T^1 + 2T^2_t + 3T^3_t)/3 \quad (3)$$

DC values of species present in the supernatant were calculated to be 0.88 for sample 3 (pH~2.8) 0.81 for sample 4 (pH~3.8), and 0.81 for sample 5 (pH~5), consistent with higher condensation rates at pH values away from the IEP. The concentrations of cyclic species (4-silicon rings) $T^2_C$ and $T^3_C$ in sample 3 are higher than those of their corresponding chain ($T^2$) and branched ($T^3$) species. This trend is reversed in samples 4 and 5.

Figure 4:
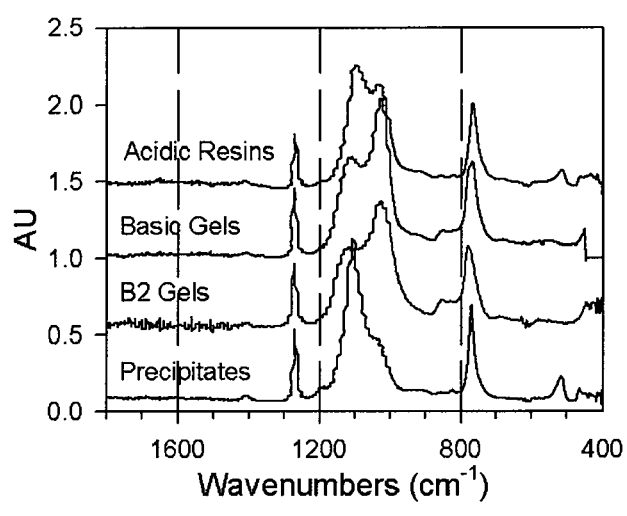
FIG. 4 shows IR spectra obtained for the different MSQ materials obtained under different processing conditions. Note that the y-axis has been offset by ~0.5 AU for each consecutive sample to allow better visualization of the data.
Figure 4:
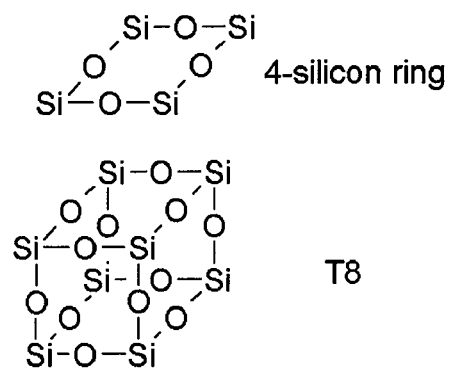

To directly evaluate the precipitates, the IR spectra of various solid materials obtained under different processing conditions were measured. IR spectra of Sample 3, shown in FIG. 4, reveal that the precipitates have a dominant asymmetric stretching band of Si—O—Si at 1120 cm$^{-1}$ with three small peaks located at 1180 cm$^{-1}$, 1030 cm$^{-1}$, 930 cm$^{-1}$. These small peaks, which show up as shoulders on the larger 1120 cm$^{-1}$ peak, correspond to asymmetric stretching bands of Si—OCH$_3$, Si—OSi (linear or branched silicon sites), and Si—OH, respectively.[23] The frequency at 1120 cm$^{-1}$ is characteristic of the adsorption of polycyclic oligomers $(CH_3SiO_{3/2})_n$, where n=8 (T8), 10 (T10), and 12 (T12).[3,2,4] The three other peaks indicate the presence of small amounts of incompletely condensed oligomers, separated together with polycyclic species. The IR spectrum also shows that there is a narrow band at 525 cm$^{-1}$ in the precipitates, which is absent in T10 and T12.[3] This peak is due to a Si—O—Si symmetric stretching vibration of a 4-silicon ring in T8.[25] Overall, the IR data show that the precipitate contains a significant amount of T8-like polycyclic species, in addition to linear and branched oligomeric structures.

The formation of T8-like species in the precipitate in samples 1-3 is likely due to consecutive condensation between 4-silicon ring species, which were observed in the $^{29}$Si NMR of the supernatant of sample 3. Furthermore, the dominant presence of 4-silicon rings in solution NMR studies indicates that higher-membered rings, if present, may not be important in the sol-gel processing, at least for MTMS under these conditions. In the case of organotrialkoxysilanes, cyclization likely competes effectively with the formation of linear and branched structures, and thus impedes gelation.[9,12a,22,26] In summary, precipitation arises from extensive cyclization and increased intramolecular condensation relative to intermolecular condensation upon reduction of pH.

Resins and Gels: In all cases where precipitates were formed (pH<IEP), resins eventually formed as dense materials on the bottom of the sample vials (samples 1-3). In addition, resins were formed over a limited pH range above the IEP (samples 6 and 7). At higher pH values (sample 8, pH~11) a self supporting monolith was formed. Referring back to the IR spectra (FIG. 4), it is clear that the resin also contains significant amounts of cyclic species when formed under acidic conditions, as demonstrated by the presence of peaks at both 1120 cm$^{-1}$ and 525 cm$^{-1}$. However, much lower amounts of such species are present in basic resins and gels than in precipitates (note: IR spectra of basic resins and gels were indistinguishable).

Under acidic conditions, the formation of insoluble polycyclic species and their inclusion into the gel network reduces the levels of branched and linear structures, and as a result, leads to insufficient levels of cross-linking to form a self-supporting gel. In such cases, the growth of the oligomeric species eventually results in highly condensed polymers that become insoluble and form the resin at the bottom of the vial.

Under basic conditions (pH>IEP), one key difference is that there is a substantial reduction of the formation of small cyclic oligomers, as observed by IR of resins and NMR of sols prior to formation of resins, which is attributed to disproportionation.[27] The higher proportion of linear and branched structures leads to different gelation behaviour, including the formation of stable sols (samples 4, 5), resins (samples 6, 7) or gels (sample 8), depending on the specific pH employed.

Resins form under conditions where phase separation of polymeric species occurs before a complete network has time to form a self-supporting monolith. Previous work has demonstrated that it is difficult to form gels from hydrolytic polycondensation of organotrialkoxysilanes.[14] Polycondensation decreases the entropy of mixing with the solvents. This reduces the miscible window of the polymerized species with the solvents. In the case of TEOS or TMOS, interactions such as hydrogen bonding and dipole-dipole interactions between silica and the solvents (enthalpic factor) often can maintain the metastability of silica sols. The interactions of MTMS-derived oligomers and polymers with polar solvents are, however, much weaker because of the existence of hydrophobic Si—$CH_3$ groups and associated van der Waals forces. As a result, the enthalpic contribution favors phase separation in MSQ. MTMS has only three functional groups, which drastically changes the properties of MSQ compared to silica.[4b,28] Weaker cross-linking and the associated gel flexibility allow collapse of local domains, due to condensation between adjacent particles and the drive to minimize surface area and hence surface free energy (see BET data below), leading to macroscopic phase separation in most one-step processes instead of microscopic phase separation. Thus, while it is easy to produce phase separation, it is not possible to obtain monolithic gels under conditions of moderate pH, owing to the smaller number of functional groups (as compared to TEOS/TMOS) and the slower condensation rates under such pH conditions.

While not wishing to be limted by theory, the formation of gels at extremely basic pH values is likely due to the fact that under such conditions the rate of hydrolysis is relatively fast compared to that at lower pH values, and the rate of condensation is more rapid than that of phase separation. The requirement for faster gelation relative to phase separation as a prerequisite for formation of gels is consistent with observations from bis-silane systems, which have two trialkoxysilyl groups, have comparable hydrophobicity to MTMS, and yet can form gels even easier than TEOS and TMOS[19] owing to the higher number of functional groups, the ability of the alkyl group to be part of the cross-linking in the gel, and the ability to form crosslinks without having to harness all three groups on a single silicon center, all of which will lead to faster condensation and allows gels to form prior to phase separation.

Two Step Processing

Gelation in the two-step process: Based on the discussion of phase-separation provided above, it appears that to obtain self-supporting monoliths, it is desirable to develop processing conditions that allow the time required for gelation to be less than or equal to the time required for phase separation. Under one-step processing conditions there are clearly limited regions where this situation will hold. However, under two-step processing conditions it is possible to separate the hydrolysis and condensation steps to a large degree, and to individually tune each step to allow a wider range of conditions for the formation of gels. The two-step process was originally utilized by Brinker et al. to prevent phase separation in TEOS derived materials.[29] This process has been used more recently for MTES derived materials to produce "superhydrophobic" foams.[6a] However, the materials produced were very fragile foams that were susceptible to swelling in organic solvents, and thus would not likely be suitable for chromatographic applications.

In the case of B2, in addition to the parameters that affect one-step processing (i.e., solvent, temperature, etc), one must also consider the duration of the acidic step and the relative and absolute concentrations of the acid and base. In this study, the concentration of base and the duration of the acidic step were held constant (unlike the previous study of MTES using two step processing, where the concentration of base was varied[6a]), while the concentration of acid used for the initial hydrolysis was varied. This allowed us to focus on the effect of the extent of hydrolysis and the final pH (which will be dependent on the initial pH, since a constant amount of base is added).

The gelation times of samples 9 (0.01M HCl/1M $NH_4OH$), 10 (0.05 M HCl/1M $NHO_4H$), and 11 (0.1M HCl/1M $NH_4OH$) are 18.1, 9.4, and 17.2 h, respectively. The final pH of these samples is in the increasing order of 9>10>11. If the only factor affecting gelation time was the final pH, then it would be expected that the gelation time should be in the decreasing order of 9<10<11 because the rate of condensation increases with the increase of pH when pH>IEP. Given that this trend is not observed, it is clear that there must be a second process that influences gelation time. In the present system, the other variable is the concentration of acid used in step one. For MTMS hydrolysis, pseudo-equilibrium at low pH (1 to 3) and r>2 can be approached in seconds or minutes.[9,10b] At 1 h, accumulation of hydrolyzed species in the first step is expected because condensation is the rate-limiting step. Addition of basic catalysts, in step 2, leads to rapid condensation. By contrast, in the one step process, hydrolysis and condensation cannot be separated.

Both 10 and 11 are initially reacted at relatively low pH (vs. sample 9), and thus would be expected to reach hydrolysis pseudo-equilibrium prior to addition of base. Upon addition of base to these systems, sample 10 should have a higher final pH than sample 11, and therefore it is expected that sample 10 should gel more rapidly than sample 11, as observed. The longer gelation time for sample 9 relative to sample 10 is likely related to the lower concentration of acid used in the first step, which would slow the rate of hydrolysis compared to the other two samples, in agreement with the study of Boonstra and Bernards.[30] The longer gelation time in sample 9 is most likely due to incomplete hydrolysis, and thus hindered the rate of condensation in the second step.

Gelation in samples 10 and 11 occurs earlier than spinodal phase separation, even though these samples have significantly different gel times, while gelation and spinodal phase separation times in sample 9 are comparable, even though samples 9 and 11 have comparable gel times. This suggests that the phase separation time for sample 9 is much longer than that required for samples 10 or 11. This may be related to the fact that in sample 9 (which has the least amount of acid catalyzed hydrolysis and the highest final pH), part of the hydrolysis will be base catalyzed, and could lead to formation of insoluble oligomers that promote more rapid phase separation. Under such conditions, one would expect the presence of a small fraction of large clusters, similar to the base catalyzed sample 8, which would lead to a large molecular weight distribution. Thus there will be a competition between phase separation of the immiscible clusters (which may also contain unhydrolyzed methoxy groups for samples 8 and 9) and gelation due to formation of spanning clusters. In sample 9, the size of clusters is likely such that the phase separation and gelation processes are equally effective, leading to a short difference in phase separation and gelation times. Overall, gelation prior to phase separation (samples 10 and 11) results in the formation of translucent gels, while comparable times for these processes (sample 9) results in an opaque gel owing to the presence of larger particles upon phase separation. Using the conditions employed in this work it was not possible to obtain transparent gels. The morphology of these materials is described in more detail below.

Morphology and Porosity of Basic and B2 Gels

Figure 5:
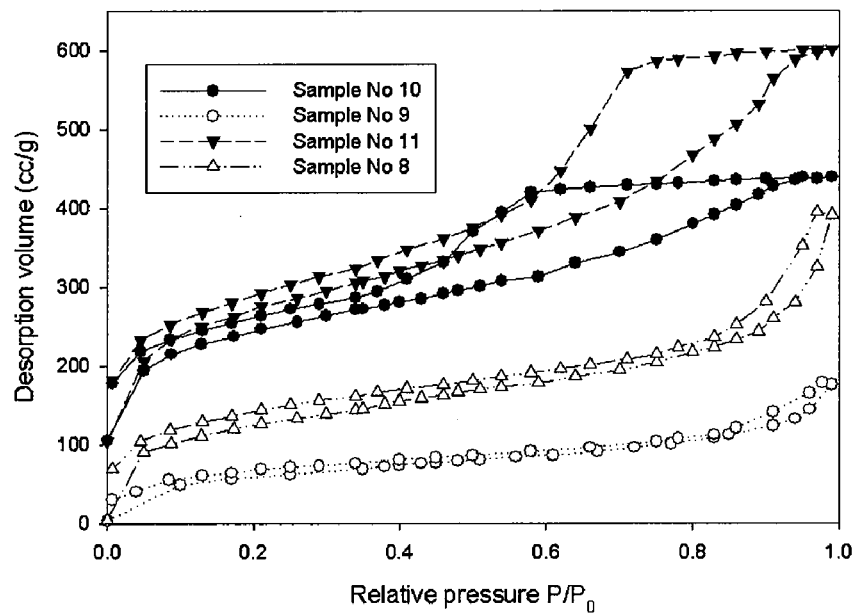
FIG. 5 shows (a) Nitrogen adsorption-desorption isotherms of MSQ gels, (b) BHJ pore size distribution of MSQ gels. Note that the y-axis data for samples 10 and 11 is shifted upward by 100 cc/g in order to see the isotherms more clearly.
Figure 5:
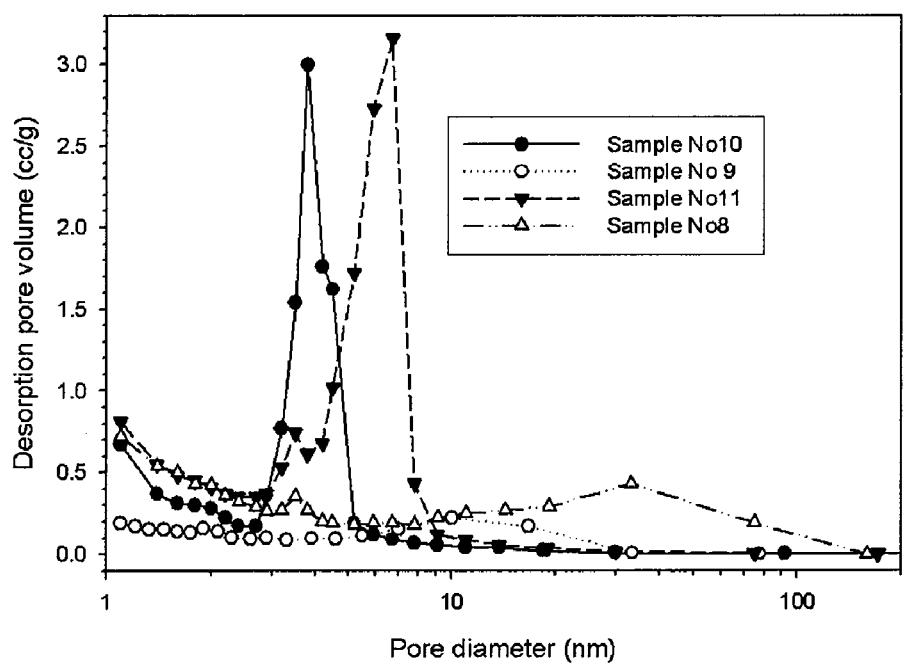

Unmodified Samples: The nitrogen adsorption data for the MSQ gels is shown in FIG. 5. Note that the y-axis data for samples 10 and 11 is shifted upward by 100 $cm^3/g$ in order to show the isotherms more clearly. The nitrogen adsorption-desorption isotherms for MSQ gels are all type IV (FIG. 5a).[31] On the other hand, the hysteresis loop of samples 8 and 9 is type H3, while those for samples 10 and 11 are type H2.[31] The corresponding pore size distributions (PSDs), using the BJH model, are presented in FIG. 5b. It is evident that the PSDs show striking differences between samples 8 and 9 and samples 10 and 11 with the former samples having a much broader PSD than the latter samples. The pore diameters are centered around 22 nm (8), 12 nm (9), 3.5 nm (10), and 6.0 nm (11). The specific surface area (SSA) obtained by multi-point BET (7 points, $0.025<p/p_o<0.35$) and total pore volume (TPV) ($p/p_o>0.99$), and the effect of temperature on these properties, are summarized in Table 2. Both the SSA and TPV decrease in the order of 11>10>8>9. One exception is the SSA values of 10 and 11, which are essentially the same. Although sample 11 has larger mesopores, considerably higher fractions of smaller mesopores (<2.5 nm) and micropores exist in sample 11 relative to sample 10. These different pore size distributions likely lead to comparable SSA in these two gels. Samples 8 and 9 appear to be opaque, indicating the presence of macropores (>50 nm diameter). These macropores are beyond the detection abilities of nitrogen sorption analysis. In contrast, only mesopores and micropores exist in samples 10 and 11. The present of macropores accounts for the lower SSA and TPV values obtained for samples 8 and 9 as compared to samples 10 and 11.

The BET values can also be considered in light of the degree of shrinkage of the different gels. Shrinkage values were in the decreasing order of 9<8<<11<10 (i.e., sample 9 shrinks the least, sample 10 shrinks the most). In fact, sample 9 has almost no shrinkage, while the volume shrinkage of 10 and 11 is as high as 50%. The shrinkage of samples 10 and 11 is consistent with the higher proportion of meso and micropores, which would be expected to lead to higher capillary forces. Samples 8 and 9 are macroporous, and thus capillary stresses during drying would be much lower, leading to insignificant pore collapse.

Figure 6:
FIG. 6 shows SEM images of MSQ gels, (a) 8, (b), 9, (c) 10, and (d) 11. The scale bar is 10 µm in each image.
Figure 6:
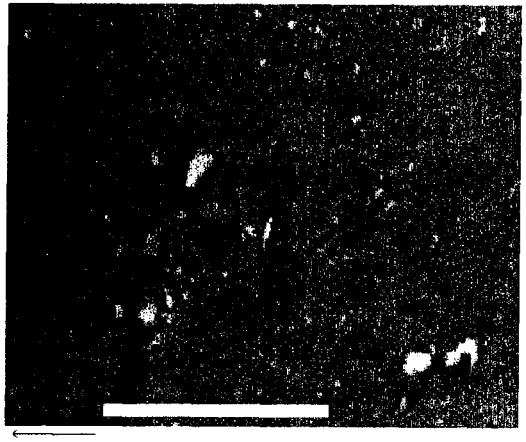
Figure 6:
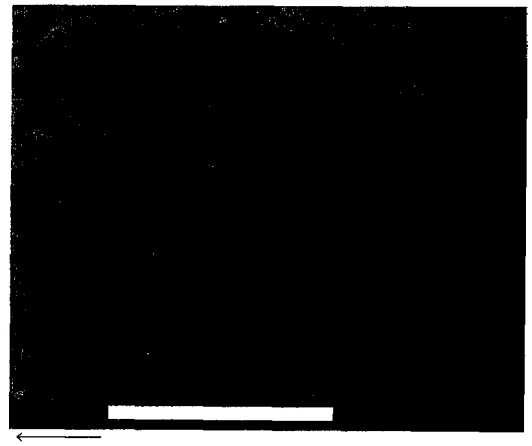

The differences in morphology of these gels are reflected in the SEM images shown in FIG. 6. Based on the images, samples 8 (Panel a) and 11 (Panel d) show some micron scale heterogeneity, indicative of the presence of macropores, MSQ sample 9 (Panel b) exhibits very large domains and coarse features; while sample 10 (Panel c) shows a much smoother structure with much smaller pores. The sizes of the ellipsoidal particles in sample 9 are in the range of 3 to 5 µm. In addition, these particles have a very rough surface with numerous smaller particles aggregated together on the surface of the larger particle. The majority of interstitial pores between particles in sample 9 appear to be in the range of 1-4 µm. The BET data show that there are also mesopores on the order of 10 nm diameter present in the sample, which are likely present within the larger particles. A key feature of sample 9 which is different from the other samples is that the onset of phase separation for sample 9 occurs about 10 minutes earlier than the time of gelation, while gelation occurs prior to phase separation in the other samples. The ability to undergo phase separation prior to gelation results in very large particles, although they are not bicontinuous, as is commonly seen in silica.[33]

The other three samples (8, 10, and 11) form initially transparent gels, indicating that gelation occurs before the onset of phase separation. However, the solution pH values are in the increasing order of 8>10>11 (note however that sample 8 is obtained by one-step processing). As a result, the appearance of MSQ 8 quickly becomes opaque, likely due to continued phase separation within the lightly crosslinked network. The SEM of this sample clearly shows macropores on the scale of 0.5-1 µm, which would be expected to scatter light efficiently, leading to the opaque nature of the sample. Comparing the SEM images of samples 8 and 9, it is clear that there is a higher concentration of macropores in the latter sample, which explains why sample 9 has a lower TPV that sample 8.

Samples 10 and 11 only transform from clear into translucent gels during aging. Sample 11, however, prepared initially in a more acidic solution generates a higher degree of hydrolysis/condensation in the first step, which may lead to a stiffer gel network,[32] which is more resistant to gel shrinkage than gel 10. This explains why sample 11 has the highest TPV in all these samples. This may also explain why sample 11 shows much coarser features in the SEM image, since the sample likely retains its coarser morphology. On the other hand, sample 10 is an overall weaker network that underwent increased shrinkage likely lead to pore collapse, which is evident in both the lower TPV and the more homogeneous structure of this material.

As noted above, variation of the initial pH of the acid hydrolysis step provides a convenient route for manipulation of MSQ morphology. Perry et al. also noted changes in the morphology of B2 derived MSQ foams upon alteration of the concentration of base used in the second step.[6a] Previous work by Nakanishi has shown that spinodal decomposition of MTMS is also possible under highly acidic conditions to give macroporous gels.[5] However, obtaining such a morphology required much higher concentrations of MTMS than was used in the present study, which may have helped to avoid macroscopic phase separation and the resulting formation of resins.

In comparing MSQ gels to silica gels, a key difference is that the formation of macroporous morphologies in silica relies on the presence of polymer additives (e.g. PEO) to promote spinodal decompostion during the sol-gel process for materials derived from TEOS or TMOS.[33] The morphologies of the resultant silica gels are thus dependent on parameters such as polymer concentration and molecular weight, silica concentration, and use of co-solvents. Such variables alter the relative rates of phase separation and gelation, and allow a range of systems containing isolated macropores, interconnected macropores, particle aggregates, and/or nanopores to be produced. This technology has been successfully used to manufacture monolithic chromatography columns,[34] which is perhaps the most successful application of sol-gel materials in recent years. In the case of MSQ materials, there is no need for organic polymers to induce spinodal decomposition, indicating that variation of pH is a much more important parameter to ultimately control morphology. Since the B2 method provides two steps that allow manipulation of pH (relative to the one-step method of Nakanishi), there is significantly more flexibility in adjusting pH, which will allow for better control of morphology.

The effect of temperature: The processing of macroporous silica materials to form chromatographic columns generally involves a high temperature step to remove all organic materials (e.g., PEO), and improve the mechanical strength of the material, followed by derivatization of the silica with silane such as octadecyldimethylcholorosilane. Clearly, such a processing step could lead to significant changes in the morphology of the resulting material. To assess the effects of temperature on the morphology of MSQ materials, BET data and pore size distributions for MSQ gels (samples 8-11) were examined as a function of the temperature used to process the sample prior to BET analysis (FIG. 7).

The effect of temperature on SSA and TPV is listed in Table 2. In all samples, both the SSA and TPV values decrease as processing temperature increases. This is due to the continuous condensation between the residual groups (Si—OH, Si—OCH$_3$, and Si—OC$_2$H$_5$) and the preferred loss of micropores (see FIG. 7b). The decline in SSA and TPV is most significant in the range 400 to 450° C. There are many reports dealing with the stability of S$_1$—CH$_3$ groups in MSQ materials. The reported value varies from 400 to 800° C., which also depends on the environment (e.g., air or nitrogen).[35] However, most of these results are obtained in dense or slightly porous films with a very low surface area. The present materials are highly porous with a high surface area. In addition, the present samples were heated for at least 10 hours at the specified temperature. As a result, the Si—CH$_3$ groups in the MSQ gels begin to decompose at the lower end of the literature values. This effect accounts for the more drastic change of SSA and TPV values in the temperature range starting from 400° C. due to the partial collapse of the gel skeleton. However, it was surprising that sample 9, with the smallest SSA, completely lost its porosity at 450° C. in contrast to the other samples. This may indicate loss of micro/mesopores, which would be expected to be the largest contributor to the specific surface area.

Figure 7:
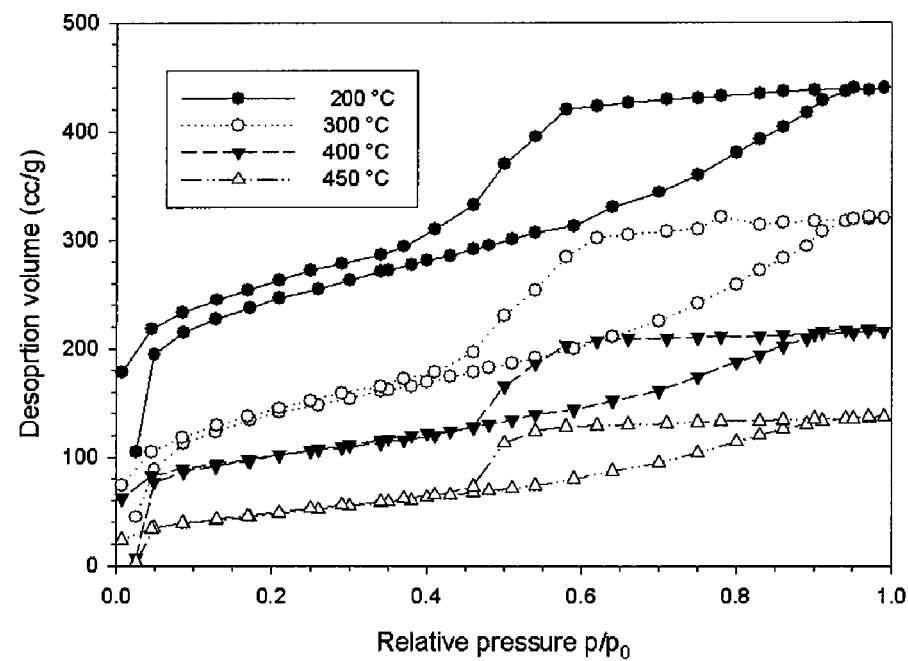
FIG. 7 shows (a) Effect of temperature on isotherms of sample 10, (b) Effect of temperature on BHJ pore size distribution of sample 10.
Figure 7:
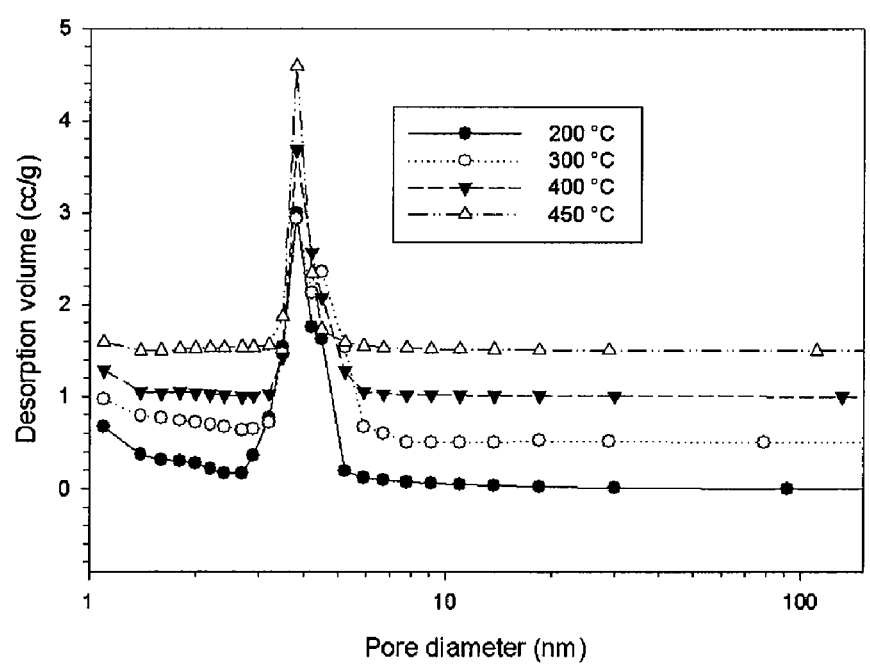

Sample 10 shows a good example of the evolution of isotherms and pore size distribution as a function of temperature, as illustrated in FIG. 7. While both the mesopores and micropores (<2 nm) are gradually eliminated with increasing temperature, the smaller mesopores (<3 nm) almost disappear completely at a temperature of 400° C. This is because these small pores have high surface energies. The loss of pores with high surface energy leads to more symmetric and narrower pore size distributions. The more uniform pore size distribution is likely to be important for maximizing the efficiency of MSQ columns for chromatographic separations.

The effect of aging in basic solutions: The stability to base is another important property if MSQ is to be used as a stationary phase, especially for separation of basic analytes. The drastic improvement of peak tailing for basic analytes has been already shown in a column that utilized hybrid particles prepared from either mixtures of Si(OR)$_4$ and CH$_3$Si(OR)$_3$,[36] or from TMOS/bis-silane mixtures.[37] To evaluate the relative stability of MSQ gels and macroporous structurally related silica gels, these materials were initially aged in 0.1 M NH$_4$OH solutions at room temperature. Their porosities were then characterized by nitrogen sorption analysis. No change in either SSA or TPV was observed for MSQ gels for up to 1 week when using a low concentration of base, while significant changes in silica were observed under such conditions (see below). This indicates that MSQ gels are more stable toward high pH due to the more hydrophobic nature of the material, which would reduce the wetting of the surface, and the less acidic nature of their silanols (which is also reflected in their higher IEP compared to silica, as noted above).

Figure 8:
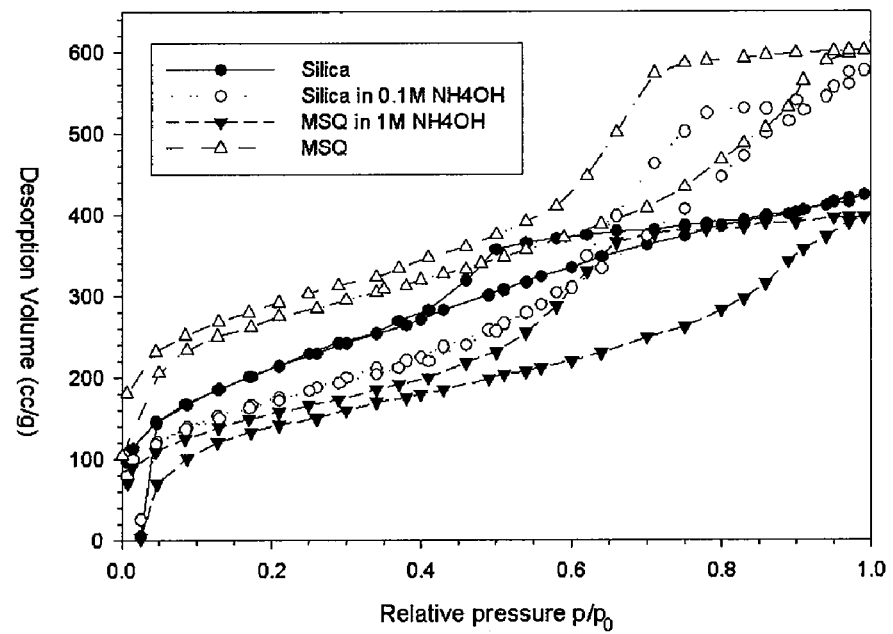
FIG. 8 shows (a) Comparison of isotherms of a MSQ gel (sample No 11) and of a silica gel aging in basic solutions (b) Comparison of BHJ pore size distribution of a MSQ gel (sample No 11) and of a silica gel aging in basic solutions
Figure 8:
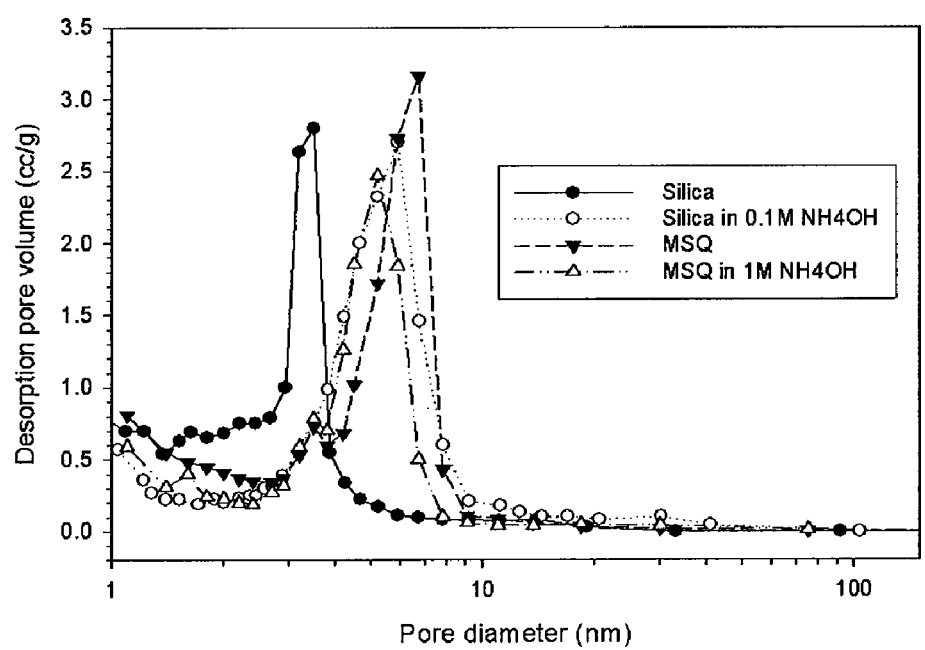

To provide a situation where changes in MSQ morphology would be more likely, the concentration of NH$_4$OH was increased to 1 M for MSQ gels, and compared this to a silica soaked in 0.1 M NH$_4$OH over the same time period. FIG. 8 shows an example of comparative nitrogen sorption analysis of a MSQ gel (sample 11) aged for 7 days in 1 M base and a macroporous silica gel, obtained following the recipe of Tanaka,[16] that was aged for 2 days in 0.1 M NH$_4$OH. During aging, both samples showed a significant decrease in the fraction of small pores (<3 nm), as expected. These changes lead to decreases in the SSA of MSQ and silica from 510 to 446 m$^2$/g and from 740 to 378 m$^2$/g, respectively. The pore size of MSQ gel was centered at 6.5 nm before aging, and dropped to 5.0 nm after 1 week. The corresponding TPV decreased from 0.74 to 0.61 cm$^3$/g over this time. This is in contrast with the result of silica, for which both the peak pore size and TPV increased from 3.5 to 5.0 nm and from 0.65 to 0.88 cm$^3$/g after only 2 days of aging in dilute base. Aging of silica in basic solutions has been extensively investigated, and the present results are in agreement with previous reports.[38] The above changes result from the dissolution (from small particles) and reprecipitation (to large particles) in the case of the silica materials. The reasons for the unexpected decreases in SSA and TPV obtained for the MSQ gel are not fully understood at this time, but may be related to the poorer mechanical properties, which could lead to collapse of local domains upon dissolution of the MSQ.

Overall, the data show that MSQ gels are stable in low concentrations of base (0.1 M) for extended periods of time and show relatively minor changes in morphology even after 1 week of aging in concentrated base (1 M). In contrast, the silica system shows significant changes in morphology upon aging in low concentrations of base for only 2 days. This fact, coupled with the fact that B2 processed MSQ is inherently highly hydrophobic,[6] suggests that columns containing B2 derived MSQ materials will be suitable for reversed phase chromatography of basic analytes.

This study provides significant insight into the polymerization of MTMS in ethanolic solutions with R=r=4, over a wide range of pH values and in cases where two-step processing is used. Under one-step processing conditions, a range of materials were obtained, including self-supporting monoliths, depending on the processing pH. However, the formation of monolithic gels is only possible at using highly basic pH values, and the resulting gel is friable. Polycondensation of MTMS using the B2 method generally results in monolithic gels with a variety of porosities, which can be controlled by manipulation of the pH in the acidic processing step. The morphology of the resulting materials is relatively stable up to temperatures of 400° C., and to exposure to highly basic solutions.

Example 2

Effect of Duration of Acidic Step

In addition to the ability to control MSQ morphology by adjustment of acid concentration in the hydrolysis step, it is also possible to obtain good control over morphology by adjusting the duration of the acidic step.

Materials were prepared using 1 ml MTMS+0.3 ml MeOH+0.186 ml 0.01 M HCl+0.186 ml 1M NH$_4$OH. First, MTMS, MeOH, and 0.01M HCl were mixed for a certain time, shown in FIG. 9, to promote hydrolysis and early stage condensation reactions, after which 1 M NH$_4$OH was added to the solution to accelerate condensation reactions. Gelation time and phase separation time were taken from the point where 1M NH$_4$OH was added. After gelation, MSQ monoliths were aged at room temperature for 1 day and at 40° C. for 1 day. MSQ gels were dried at 120° C. for 1 day, and/or at 300° C. for 1 day for characterization.

Figure 9:
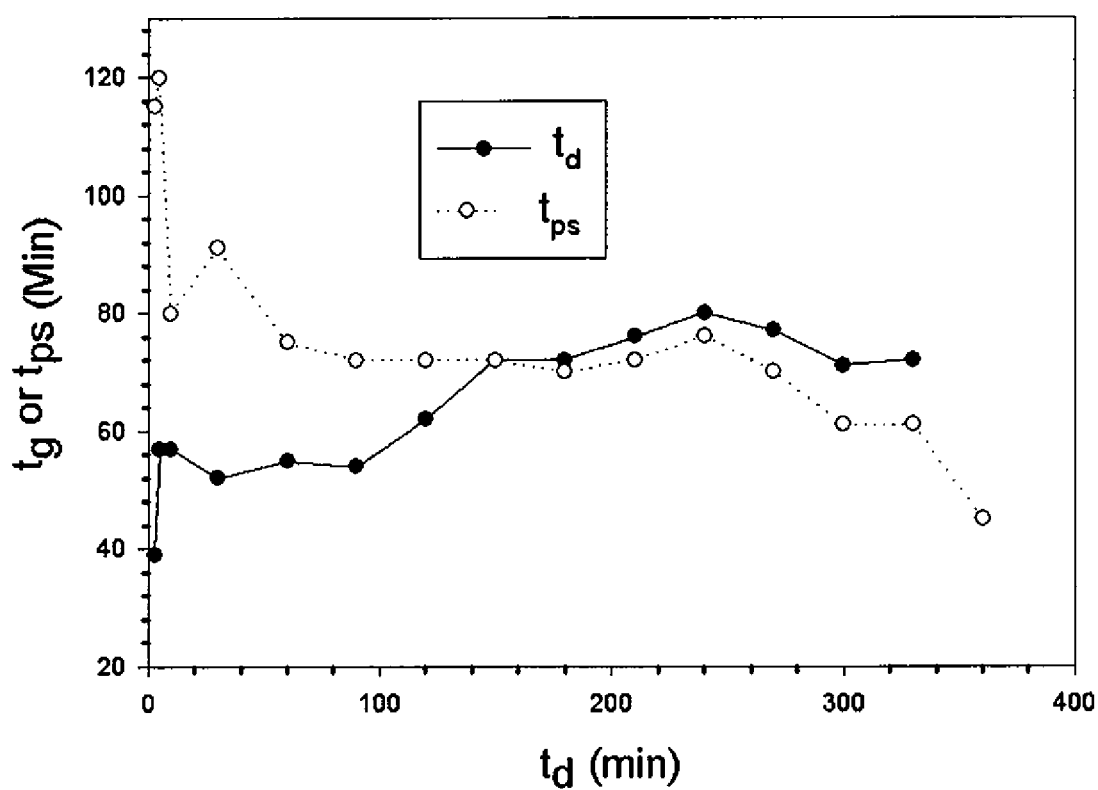
FIG. 9 shows the effect of the duration of the acidic step (td) on gelation time (tg) and phase separation time (tps).

The effect of the duration of the acidic step on gelation and phase separation behaviour is shown in FIG. 9. In general, increasing the duration of the acidic step ($t_d$) leads to an increase in gelation time ($t_g$) and a decrease in the phase separation time ($t_{ps}$), leading to an increase in $t_g - t_{ps}$. The crossover point where $t_{ps}$ becomes less than $t_g$ is at $t_d$=2.5 hrs. At $t_d$ values of longer than 6 hrs, macroscopic phase separation (flocculation) occurs instead of gelation to form a self-supporting monolith. Thus, under the conditions employed, a wide range of $t_g - t_{ps}$ values can be accessed by simply varying the duration of the acidic step. This has clear implications in the control of morphology, as the difference in gelation and phase separation times controls the feature sizes within the resulting MSQ materials.

Figure 10:
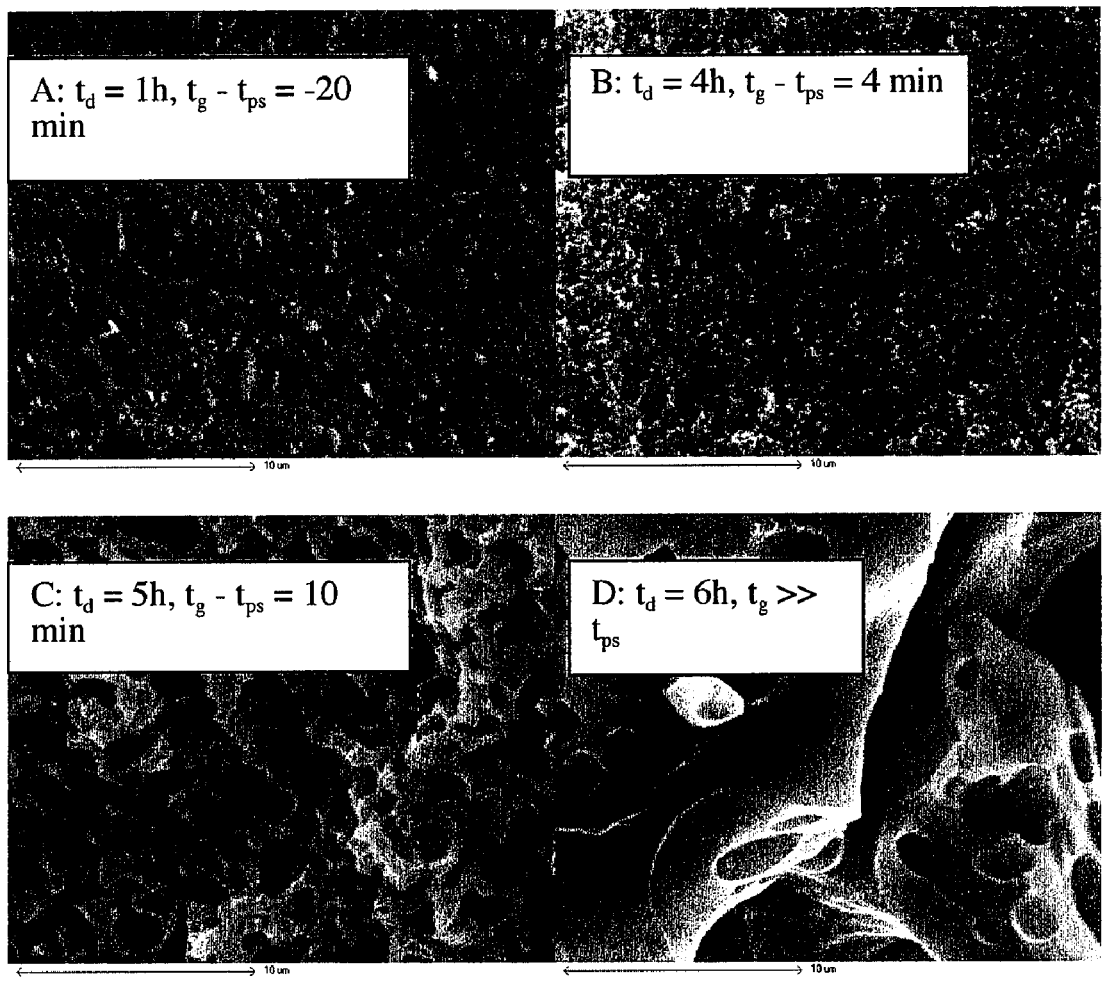
FIG. 10 shows SEM images of MSQ monoliths formed using different durations of the acidic step, after drying at 120° C.

The effect of the duration of the acidic step on morphology was examined using SEM imaging, nitrogen porosimetry and mercury intrusion porosimetry. SEM images, shown in FIG. 10, indicate that the feature sizes (pore and particle diameters) of MSQ gels increase with the increase of $t_g-t_{ps}$. This data show that in cases where gelation occurs prior to phase separation (case A), materials that contain primarily mesopores are formed. However, systems in which the gelation time is only slightly longer that the phase separation time (4-10 min, cases B and C) show a significant fraction of macropores, with the size of macropores increasing with the increase in tg-tps. Systems that have very long hydrolysis times, and correspondingly large differences in gelation and phase separation time (case D), do not form self-supporting monoliths, but rather form flocculated materials that show very large feature sizes. The ability to control the value of $t_g-t_{ps}$ by adjustment of the duration of the acidic step provides a means for very fine control over the feature sizes of the materials, leading to the ability to access a wide range of morphologies.

Figure 11:
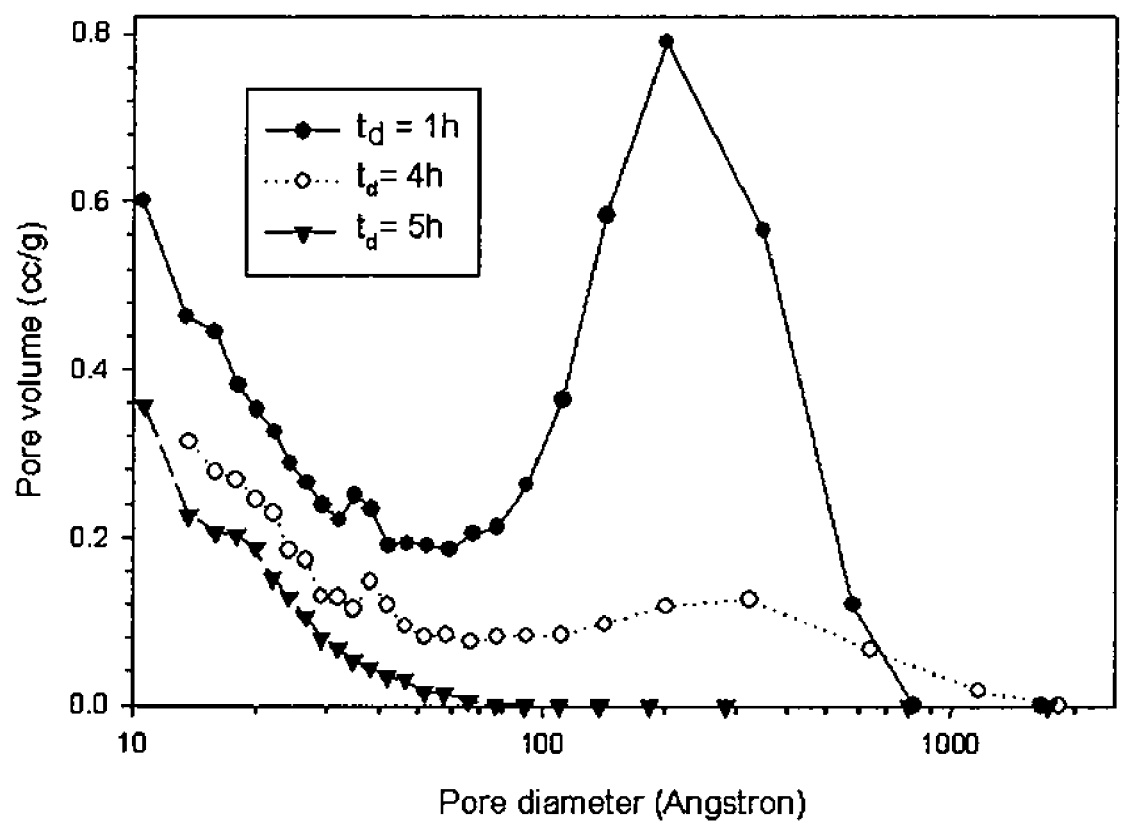
FIG. 11 shows pore size distribution of MSQ gels formed using different durations of the acidic step, obtained by nitrogen porosimetry, after drying at 200° C. in vacuum for 24 hrs.

Nitrogen sorption data (Table 3 and FIG. 11), which probes the morphology of mesopores, shows that both surface area and pore volume of the pores with diameters of less than 100 nm decrease as $t_d$ (and thus $t_g-t_{ps}$) increases. Samples with a td of 1 h (case A in FIG. 10) have very small mesopores with a mean diameter of <10 nm. Samples with td values of 4 h or 5 h (case B and C from FIG. 10) show bimodal mesoporous morphologies, with a fraction of pores with diameters of >10 nm, but a significant proportion of pores in the range of 10-100 nm diameter, with the median mesopore diameter being in the range of 20-30 nm. The larger pore diameters correspond to a smaller surface area, and thus it is clear that variation of td can be used to control surface area and pore volume, which should be useful for optimizing both backpressure and capacity when such materials are used for chromatographic applications.

Figure 12:
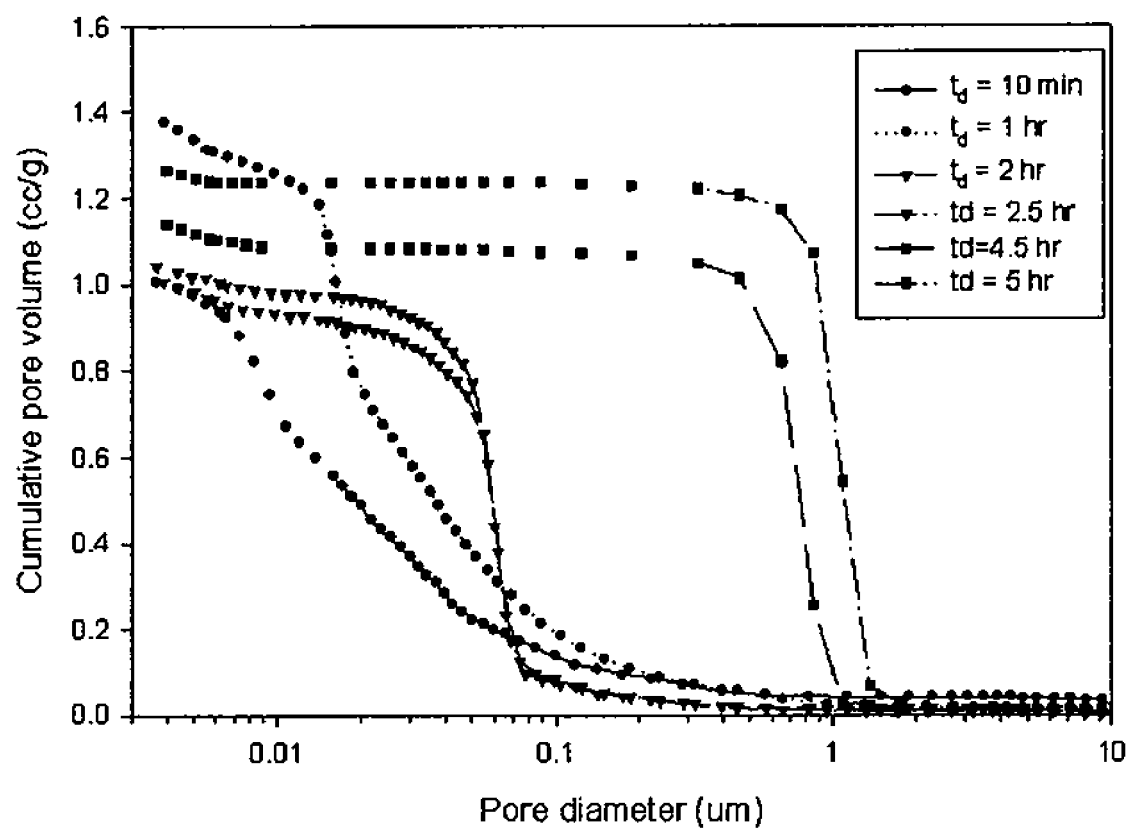
FIG. 12 shows the pore size distribution and cumulative pore volume of MSQ gels formed using different durations of the acidic step, obtained by mercury intrusion porosimetry, after drying at 300° C.
Figure 13:
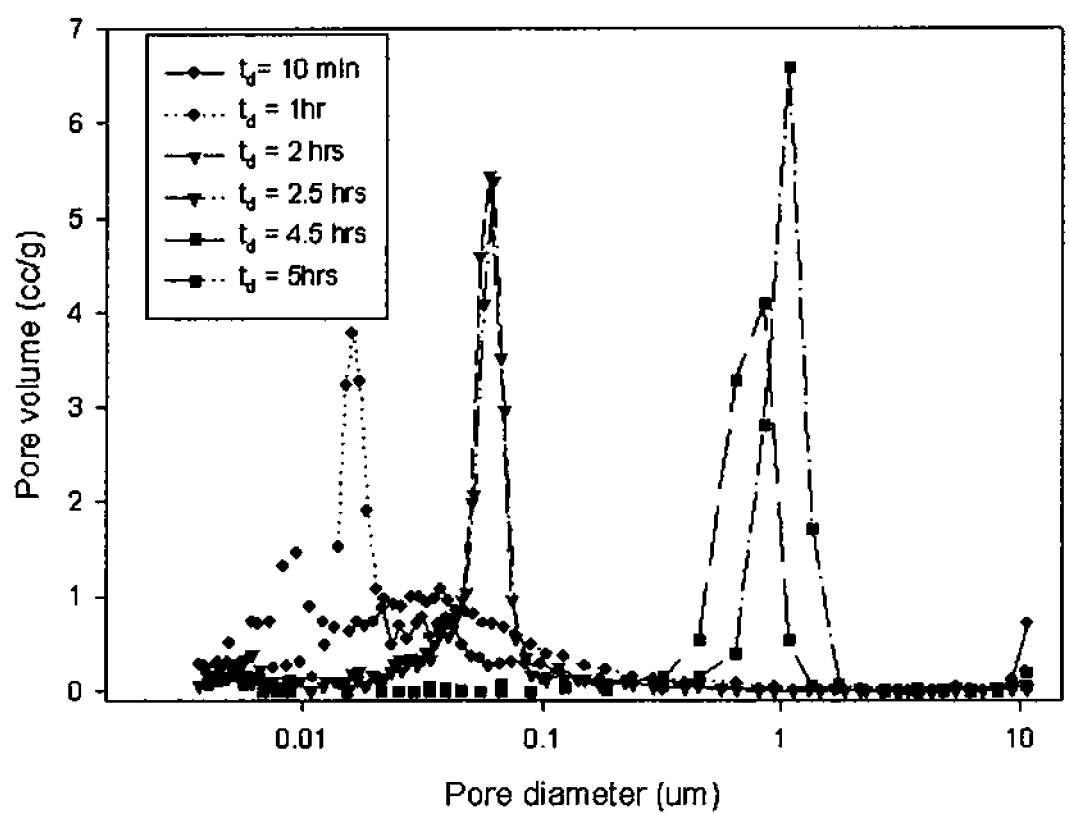
FIG. 13 shows the pore size distribution and differential pore volume of MSQ gels formed using different durations of the acidic step after drying at 300° C.

Mercury intrusion porosimetry data, which provides information on the nature of the macropores in the MSQ materials, is shown in FIGS. 12 and 13. These data were obtained for samples that were heated to 300° C. to densify the material and avoid pore size artifacts due to compression of materials under the high pressures used for the mercury intrusion experiment. The data show that the size and proportion of macropores increases as $t_d$ increases. Generally speaking, materials prepared with td values of less that 2 h show essentially no macropores, in agreement with the SEM data shown in FIG. 10. Those formed with $t_d$ values of 2-2.5 h show the presence of a narrow distribution of pores with mean diameters in the range of 80-100 µm. Materials formed using td times of 4.5-5 h show much larger macropores, with mean diameters in the range of 900-1000 nm and a relatively narrow size distribution.

Example 3

Effect of MTMS:WATER Ratio on Shrinkage/Springback

In addition to the concentration of acid and duration of the acidic step, other parameters can also influence the morphology and shrinkage of MSQ materials. It is demonstrated that water concentration can be used to manipulate morphology, and thus shrinkage and springback of methylsilsesquioxanes (MSQ) prepared by an acid/base two-step procedure in ethanolic solutions. The morphologies of MSQ gels were characterized by SEM, nitrogen sorption, and mercury porosimetry. As expected, shrinkage decreases as the volume of macropore increases. One of the samples, however, displays springback phenomenon (i.e. shrinkage followed by expansion during drying) without surface modification or solvent exchange. This is attributed to intrinsic properties of MSQ monoliths: hydrophobicity and a low concentration of reactive groups.

Shrinkage is induced by the capillary force and resisted by the bulk modulus of the gel.[39] Controlling shrinkage of sol-gel derived materials during drying presents a considerable challenge. This is mainly due to the presence of micropores and mesopores in the wet gels, leading to high capillary pressure. Traditionally, suppressing shrinkage was overcome by supercritical drying, where in principle there is no capillary force.[40] However, this method is batch and size-limited (therefore expensive) and may be dangerous owing to the high pressures needed to create supercritical conditions.

Two methods have been commonly used to prepare low-density silica without macropores under ambient pressure conditions.[41,42] (1) Wet gels were exchanged by solvents with low surface tension such as hexane and followed by surface modification with trimethylchlorosilane (TMCS). This method was originally published by Smith et.al.[41] The silica gel exhibits significant shrinkage during drying and nearly spring back to its original size, leading to silica density as low as 0.1 cm$^3$/g. This method has been further developed to directly silylate in hydrogels[43] or alcogels.[44] One key feature of this method is the reduction of the active Si—OH and Si—OC$_2$H$_5$ groups by passive Si—(CH$_3$)$_3$ groups, which prevents irreversible condensation during drying. (2) Wet gels were aged in solutions of precursors followed by solvent exchange. The increasing gel modulus during aging can resist the capillary force induced by small pores and gel density as low as 0.2 cm$^3$/g was obtained.[42] However, both methods require several times of solvent exchange. This process is diffusion-limited and therefore time-consuming, which is not suitable for preparing large size samples. It also consumes a lot of organic solvents and therefore poses environmental problems.

Since the driving force of shrinkage is the capillary pressure, which increases with the decrease of pore radius, one can therefore reduce shrinkage by changing the pore size distribution specifically by increasing volume of macropores. This approach was demonstrated in silica prepared by two methods: namely colloidal crystal templating[45] and spinodal decomposition.[33] The former way generates ordered macroporous materials, which have potential applications as photonic crystals, chemical sensors, catalysts, and membranes. The interconnected macropore materials produced by the latter method have been used as monolithic columns, which are commercially available from Merck.[34] No shrinkage was found in pure silica and hybrid materials in a capillary up to 0.1 mm and 0.2 mm diameters, respectively.[16]

While these efforts focus on four functional group monomers such as tetraethoxylsilane (TEOS), tetramethoxysilane (TMOS), and water glass, Nakanishi et al. demonstrated that a three functional group precursor methyltrimethoxysilane (MTMS) prepared under highly acidic conditions (molar ratio MTMS:MeOH: 1 M HNO$_3$=1:2:2) show superior advantage in terms of shrinkage.[5] Hydrolysis and condensation of MTMS lead to methylsilsesquioxane (MSQ) gels, which show no shrinkage in the capillary up to 0.5 mm diameter. They attributed this to steric hindrance offered by the methyl group. In the normal phase mode, MSQ monolithic columns display a theoretical plate number as large as 100,000 while separating toluene, 2,6-nitrotoluene, and 1.2-dinitrobenzene, demonstrating its potential application in chromatography. Other applications of MSQ including insulating coatings,[1] additive powders,[2] low dielectric constant films,[4,6] superhydrophobic materials,[6] and protein immobilizing matrixes[8] have been realized and proposed.

As noted above, polymerization of MTMS using an acid/base two-step procedure considerably increases the window for the formation of MSQ monolithic gels compared to methods employing only acidic or basic catalyst. As a result, B2 can be regarded as generic method to yield MSQ monoliths. These gels exhibit various morphologies including macropores without phase separation initiators such as PEO, which is required in the case of silica.[33]

The effect of water concentration on MSQ morphologies was systematically investigated. While it is expected that the degree of shrinkage for MSQ gels reduces as the volume of macropores increases, it is unexpected that these materials with intermediate volume of macropores exhibit a springback phenomenon. The key advantage of the present method compared to low-density silica gels is that no solvent exchange and surface modification is required, which drastically simplifies the procedure. The springback and minor shrinkage of MSQ monoliths reported herein are very useful, for example, to prepare aerogels, catalysts, and monolithic columns, and to increase the activity of immobilized enzymes.

Figure 14:
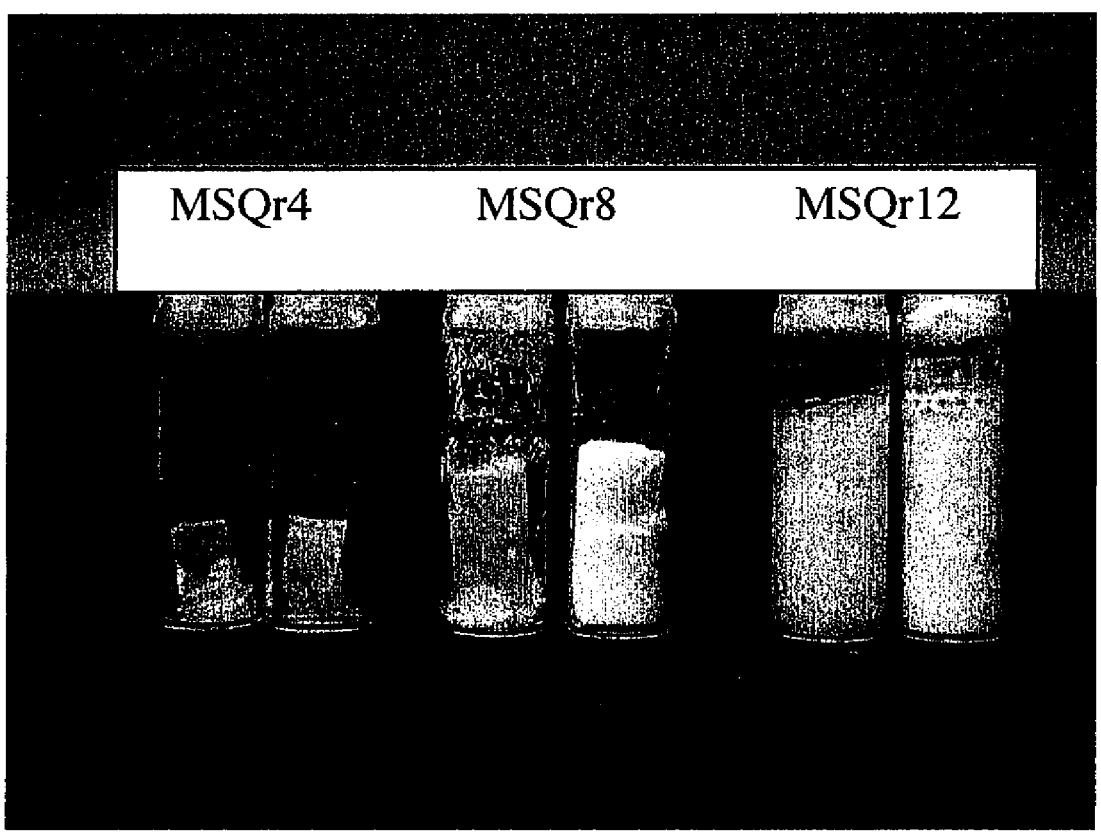
FIG. 14. Images of MSQr4, MSQr8, and MSQr12 gels during drying and after drying, for each pair, the left sample is during drying, while the right sample is after drying.

Detail procedures to prepare MSQ gels were as follows. Briefly, 1 ml precursor MTMS (98%, Aldrich, Canada), 0.813 ml solvent EtOH, and catalyst 0.02 M HCl (volume varied) was first mixed to generate hydrolyzed monomer and oligomers. After 1 h of reaction, 1 M NH$_4$OH (volume varied) was added to promote rapid condensation and gelation. The mole ratio of catalysts 0.02 M HCl and 1 M NH$_4$OH is fixed to be 1. The r symbol is used to represent the mole ratio of MTMS over water (the sum of 0.01 M HCl and 1 M NH$_4$OH) and an r value ranging from 3 to 12 was studies. r values 4, 8, and 12 are corresponded to volumes of 0.01 M HCl (which is equal to the volume of 1 M NH$_4$OH), 0.25, 0.50, and 0.75 ml, respectively. Therefore, the present gels can be distinguished as MSQr4, MSQr8, and MSQr12. Drying was performed in air at room temperature for at least 7 days. Three different types of shrinkage of these MSQ samples were found, namely significant shrinkage (r<5), springback (r=6 to 8), and minor shrinkage (r>9). Representative cases are shown in FIG. 14.

Figure 15:
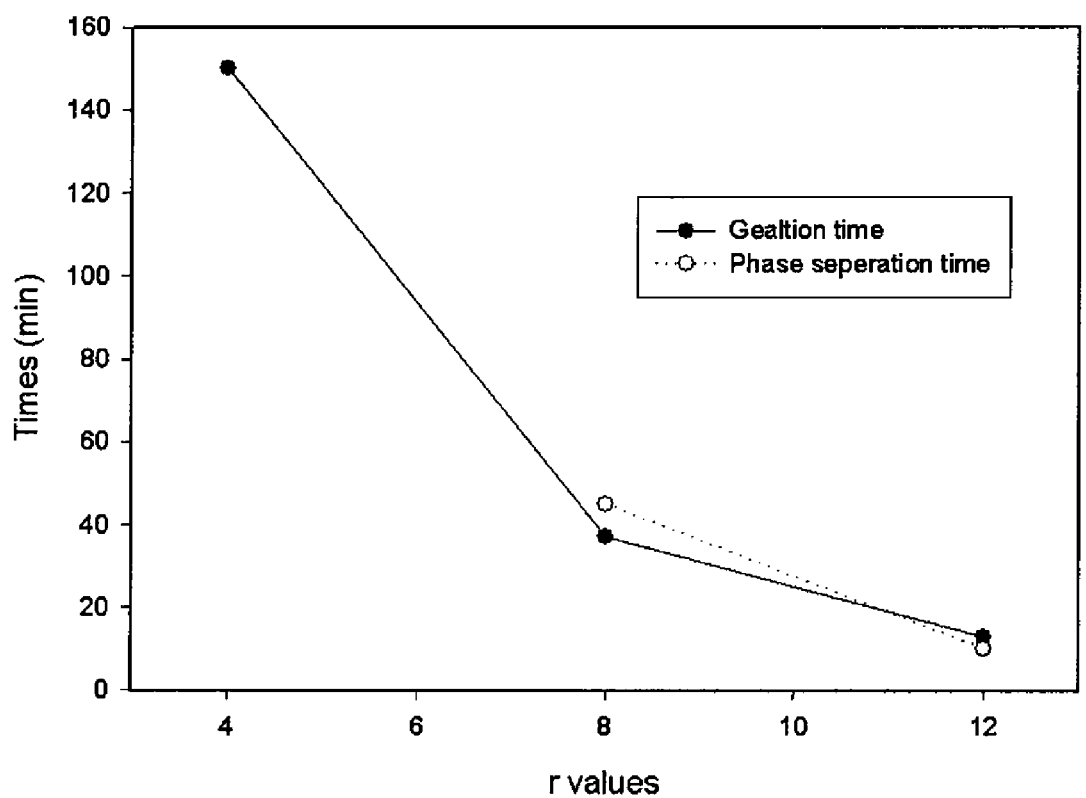
FIG. 15. Times of gelation and phase separation of MSQ samples

Gelation and phase separation: The times of gelation ($t_g$) and phase separation ($t_{ps}$) for MSQr4, MSQr8, and MSQr12 are depicted in FIG. 15. As can be seen from this Figure, the gelation times of MSQ gels are 150 (MSQr4), 37(MSQr8), and 13 (MSQr12) minutes, respectively. The phase separation times for MSQr8 and MSQr12 are 45, and 10 minutes, respectively. Phase separation of MSQr4 is not obvious because it took 2 days for the transparent gel to become translucent. The driving force for both gelation and phase separation is governed by condensation reactions. In the range studied, the rate of condensation increases with the rise of water concentration. This explains why times of $t_g$ and $t_{ps}$ exhibit same trend and become shorter from MSQr4 to MSQr12. Phase separation in MTMS systems, however, takes place without polymer additives, which are usually required in TMOS or TEOS systems.[33] This is mainly due to the hydrophobicity of the intrinsic Si—CH$_3$ groups. With the increase of the degree of condensation, the hydrophobic and polymerized MSQ species become immiscible with the highly polar solvents, leading to phase separation. FIG. 15 also highlights the importance of water concentration because of its more polar and stronger tendency to form hydrogen bonding than the alcohol solvents. As a result, there is a crossover between $t_g$ and $t_{ps}$. Phase separation occurs prior to gelation in MSQr12, while this trend is reversed in MSQr8. This difference significantly affects the morphologies of these MSQ gels, as evidenced in the following SEM images and mercury porosimetry measurements.

Figure 16:
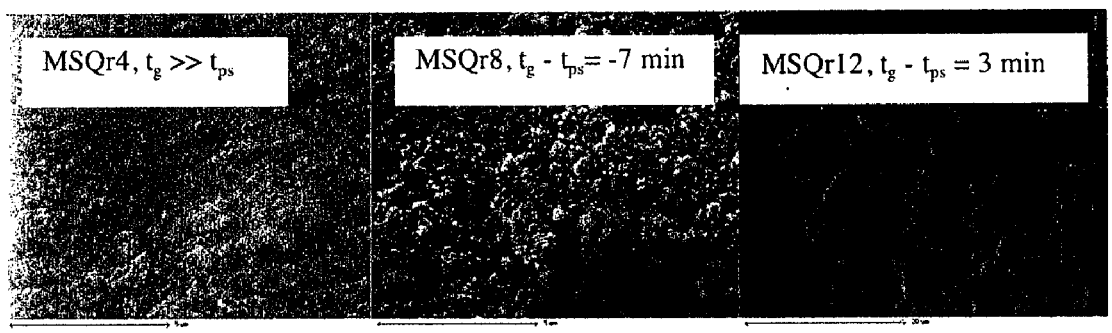
FIG. 16. SEM images of MSQ gels, MSQr4 bar=5 µm, MSQr8 bar=5 µm, MSQr12, bar=20 µm.

SEM images: FIG. 16 shows the SEM images (Philips 515) of the three MSQ monoliths. Two distinct differences can be drawn from these images. The first one is that that the feature sizes (pores and particles) increase drastically from MSQr4 to MSQr12 even though the magnification of MSQr12 is only ¼ of the other samples (Note: A high magnification image of MSQr12 cannot be obtained because of its charge.) Macropores are clearly present in MSQr8 ($t_g-t_{ps}$=−7 min) and MSQr12 ($t_g-t_{ps}$=3 min), while no pore can be recognized in MSQr4 ($t_g$>>$t_{ps}$) at this magnification. This result exemplifies the importance of the relative times of gelation and phase separation as one of the major factors to control the morphologies of sol-gel derived materials. Only when $t_g$ and $t_{ps}$ are comparable, monoliths with macropores are generated and the pore sizes increase with the increase of the value of $t_g-t_{ps}$. The second difference among these gels is that MSQr8 and perhaps MSQr4 have an interconnected pore and particle network. In contrast, MSQr12 exhibits large and distinct aggregates assembled from either ellipsoidal or spherical particles in an order of μm. The reason for this remains unclear. It may relate to the rapid gelation and highly polar solvents in MSQr12. This material has very poor mechanical properties (easy to be smashed into powders) because of not only its low density (0.205 g/cm$^3$) but also its aggregated nature of particles.

Figure 17:
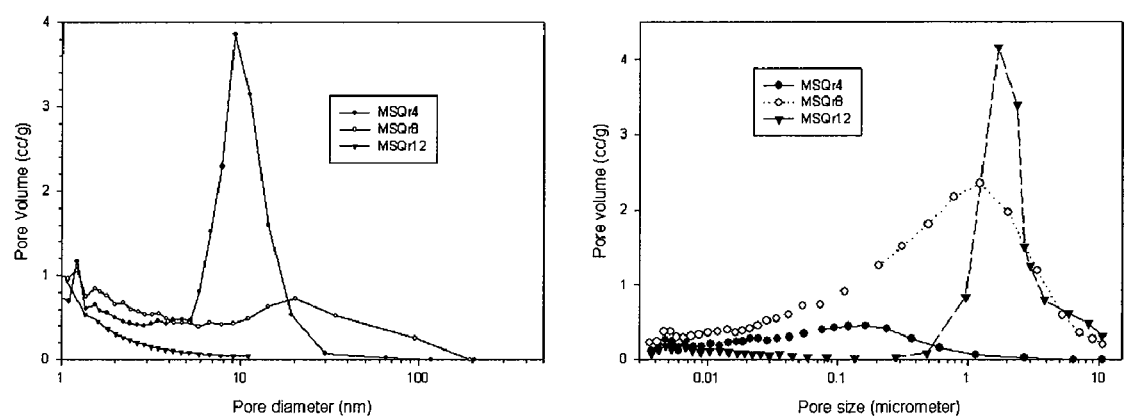
FIG. 17. Pore size distributions of MSQ gels (left panel, nitrogen sorption; right panel, mercury porosimetry)

Porosity and shrinkage: In order to obtain a clearer picture of the relationship between morphology and shrinkage, nitrogen sorption ((Quantachrome NOVA 2200) and mercury intrusion porosimetry (Quantachrome PoroMaster GT) measurements were performed to obtain quantitative data on porosity. FIG. 17 shows the pore size distributions of MSQ gels. Nitrogen sorption (left panel) results clearly demonstrate significant change of pore size distributions for pore sizes larger than 4 nm, while the difference of pore sizes smaller than 4 nm is relatively small. Mesopores are centered at 8 nm (MSQr4) and 20 nm (MSQr8); MSQr12, on the other hand, displays no pore larger than 12 nm. These discrepancies may indicate different mechanisms of pore formation. The fact that smaller pores (<4 nm) are not closely related to the particle sizes as shown in SEM images, probably indicates that they are intraparticle pores and their formation is controlled by kinetics at the early stage of the reaction. Mesopores bigger than 4 nm are proportional to particle sizes, likely indicating that they are mainly intra-particle pores. It should be pointed out that pores in MSQr12 are well above 30 nm, which is beyond detection of nitrogen sorption technique.

Similar to nitrogen sorption analysis, mercury porosimetry data (FIG. 17, right panel) show these materials have broad pore size distributions. The relatively sharp curve in MSQr12 results from shrinkage and cracking during measurement because of the high intrusion pressure (up to 60,000 psi). Shrinkage of low-density silica during mercury porosimetry test has been well documented.[47] Shrinkage is also expected to occur in MSQr8, although to a much less degree. However, no crack was visualized in this material. In addition of distorting the pore size distribution, shrinkage lead to underestimating the pore volumes of macropores as discussed below.

Figure 18:
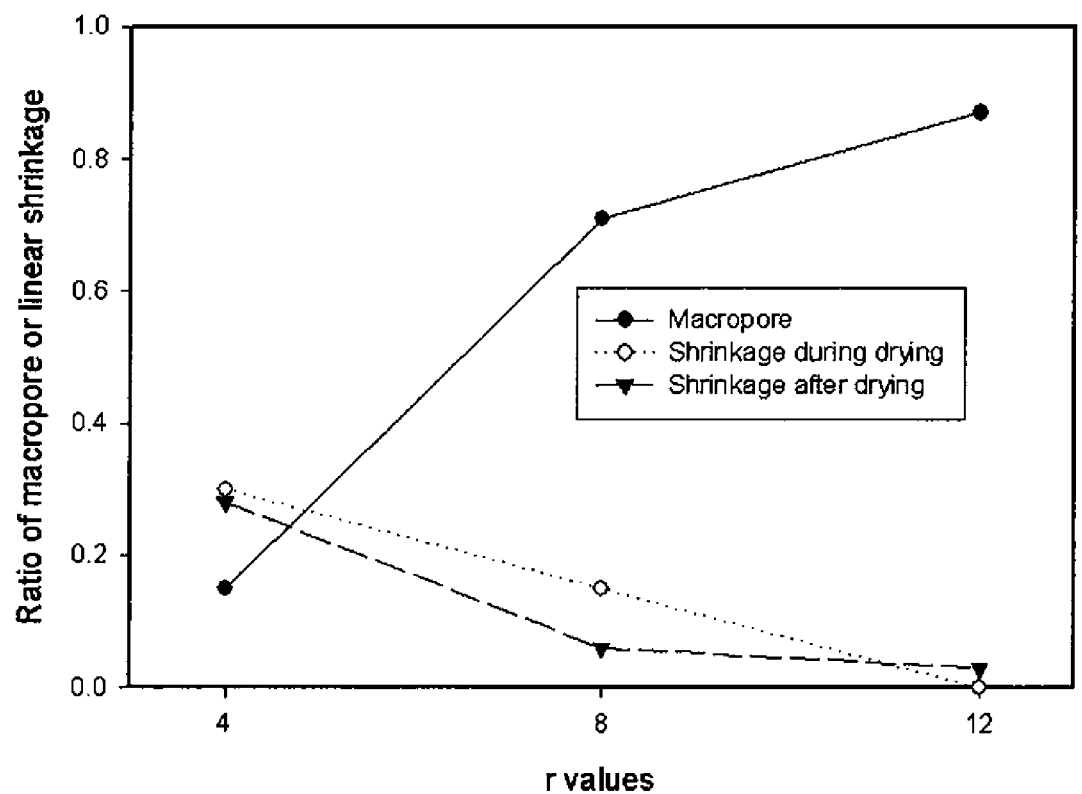
FIG. 18. Relationships between ratio of macropores and linear shrinkage of MSQ gels during and after drying.

FIG. 18 displays the relationship between r value and the ratio of macropore volume (>50 nm diameter) over the total pore volume (macropore+mesopore (2 to 50 μm)+micropore (<2 nm)) and the linear shrinkage during drying and after drying of the three MSQ samples. Pore sizes bigger and smaller than 50 nm are obtained by mercury porosimetry and nitrogen sorption, respectively. As can be seen in FIG. 18, the ratio of macropore volume increases from 15% (MSQr4) to 71% (MSQr8) to 87% (MSQr12). Considering the fact that macropore volume is below its actual value in MSQr12 and to a less degree MSQr8, the latter two numbers should be even higher. As a result, the capillary force executed on MSQr4 and MSQr12 during drying is highest and lowest, respectively. Although the bulk modulus increases with the decrease of r value due to the increase of density, the induced capillary force apparently overcome the resistance of the gained bulk modulus in MSQr4, leading to its significant shrinkage during drying (up to 30%). The ratio of macropore volume in MSQr8 lies between the other two gels and the size of most mesopores in this sample is much bigger than that in MSQr4. Consequently, MSQr8 has a less shrinkage compared to MSQr4 and most of the contracted body recovers after drying. This leads to the question of why springback occurs. While not wishing to be limited by theory, sol-gel materials can be regarded as an assembly of fractal clusters. Capillary stress during drying induces cluster penetration. If the penetrated boundaries among these clusters are chemically active (e.g., having a large number of Si—OH groups), polycondensation may take place.[48] In silica gels, reducing these reactive groups on the surface is fulfilled by surface modification using TMCS, which offers geometric restriction of irreversible condensation during drying.[41] In this treatment, the hydrophilic silica surface is also turned into hydrophobic due to the $Si(CH_3)_3$ groups of TMCS. These two factors seem to increase the range of elastic deformation in silica gels, leading to springback at the critical point of drying. From solid-state $^{29}$Si NMR spectra (not shown), it was determined that the degree of condensation (DC) of these MSQ gels varies from 0.92 to 0.95, which is higher than less than 0.90 in dried silica.[49] Taking typical values 0.93 (MSQ) and 0.85 (silica) for example, the empirical formulas are $(CH_3Si(OR)_{0.19}O_{1.405})_n$ (MSQ) and $(Si(OR)_{0.8}O_{10.6})_n$ (silica), where R is H, $CH_3$ or $C_2H_5$. This means that the number of potential reactive groups per silica in MSQ is 4 times less than that in silica. Therefore, the two requirements (hydrophobic surface due to $S_1$—$CH_3$ groups and low concentration of Si—OH groups) in MSQ materials are self-regulated. If shrinkage during drying is not far way from the domain of elastic deformation, most of the contracted body will recover, as shown in MSQr8. Otherwise, significant plastic deformation allows Si—O—Si bonds to be broken and bent, leading to irreversible shrinkage as in the case of MSQr4. Unfortunately, cracks frequently occur during springback in large samples. This is caused by the capillary force gradient due to the broad pore size distribution.

In summary, the effect of water concentration on shrinkage of MSQ gels prepared by an acid/base two-step procedure is presented here. The extent of shrinkage decreases with the rise of water concentration due to the increase of macropore volume. Sample MSQr8 shows springback without solvent exchange and surface modification due to the intrinsic hydophobicity and low concentration of reactive groups. This phenomenon may be used to manufacture monolithic column with different porosity by controlling the degree of springback. MSQ materials with macropores may also find applications in catalysis, solid phase extraction, and biotechnology.

Example 4

Chromatographic Performance

One of the major breakthroughs in chromatography in the past decade has been the development of monolithic stationary phases. The materials have a bicontinuous meso/macroporous morphology that simultaneously provides low backpressure and high surface area, providing opportunities for rapid and efficient separation of analytes. The materials are generally formed by spinodal decomposition of a polymer, such as PEO, in a growing silica polymer network formed from tetraalkoxysilanes such as TMOS or TEOS. The mixture can be formed as rods or loaded into capillary columns prior to gelation of the silica, resulting in a monolithic gel. After calcining and deriviatizatin of the silica by treatment with C-18 silane coupling agents, the columns can be used for reversed phase chromatography.

While such columns have shown great promise for the development of stationary phases, significant issues still remain related to shrinkage and pH stability of the materials. Silica materials prepared from tetraalkoxysilanes show significant shrinkage, and thus it is not possible to prepare capillary columns with inner diameters larger that about 100 um. The material itself is not stable to hydrolysis at pH values above about 8, and thus it is not possible to use such columns for challenging separations that require basic mobile phases, such as the separation of basic analytes.

As described above and below, MSQ materials prepared by the two-step method can be used to form monolithic stationary phases that are suitable for chromatographic separations of analytes in a mixture. Based on the pH stability data and shrinkage data presented above, it is clear that such materials can operate at basic pH for extended periods, and that such materials show much lower shrinkage than conventional silica materials. Thus the materials should be amenable to formation of wider bore capillary columns.

Columns were prepared using 1 ml MTMS+0.3 ml MeOH+0.186 ml 0.02 M HCl+0.186 ml $NH_4OH$, $t_d$=3 h 40 min, $t_g$-$t_{ps}$=7 min. Samples were loaded into 100 um capillaries immediately after addition of base and allowed to undergo gelation and phase separation in the capillary. After gelation and phase separation, the column was aged at room temperature for 2 days and at 70° C. for 2 h. Subsequently, the column was dried at 120° C. for 2 h and at 300° C. for 24 h. On column derivization was conducted at 90° C. for 2 h using 10% (v/v) octadecyltrichlorosilane in toluene.

Figure 19:
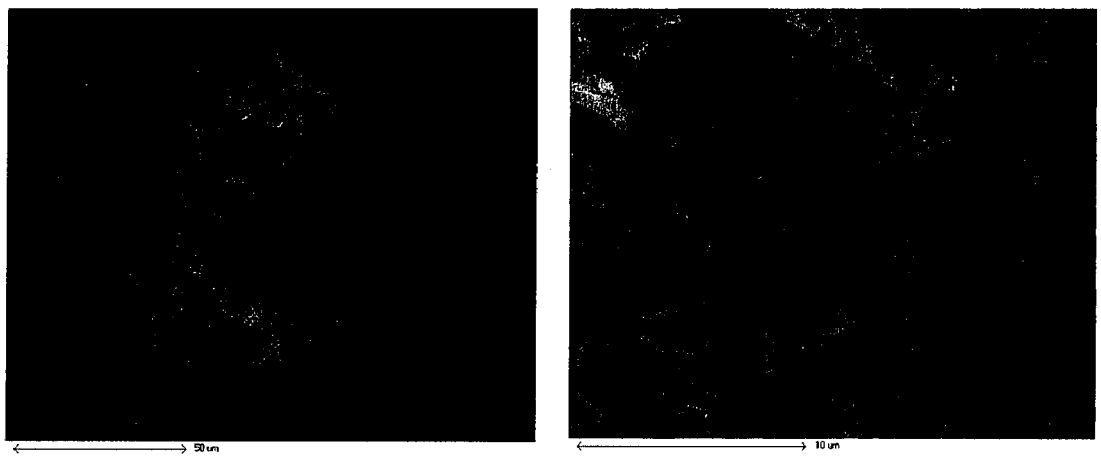
FIG. 19 shows SEM images of a 100 µm column containing monolithic MSQ formed by a two step processing method.

FIG. 19 shows low and high magnification SEM images of a MSQ monolith within a 100 μm diameter capillary column. The image on the left shows that there is no shrinkage or pullaway of the MSQ monolith from the capillary wall. The image on the right shows the bicontinuous mesoporous/macroporous structure of the monolithic stationary phase. The apparent macropore sizes are in good agreement with those determined by Hg porosimetry, as described in Example 2.

Chromatographic experiments were carried using these columns interfaced to an Eksigent nanoLC pump, using a GL sciences nano UV-Vis detector operated at 210 nm and at room temperature for detection of analytes. Alkylbenzenes (toluene, ethylbenzene, propylbenzene) were dissolved in mobile phase (MeOH:water=80:20) and eluted through the column under isocratic elution conditions. The total concentration of alkylbenzenes was $10^{-3}$ V/V.

Figure 20:
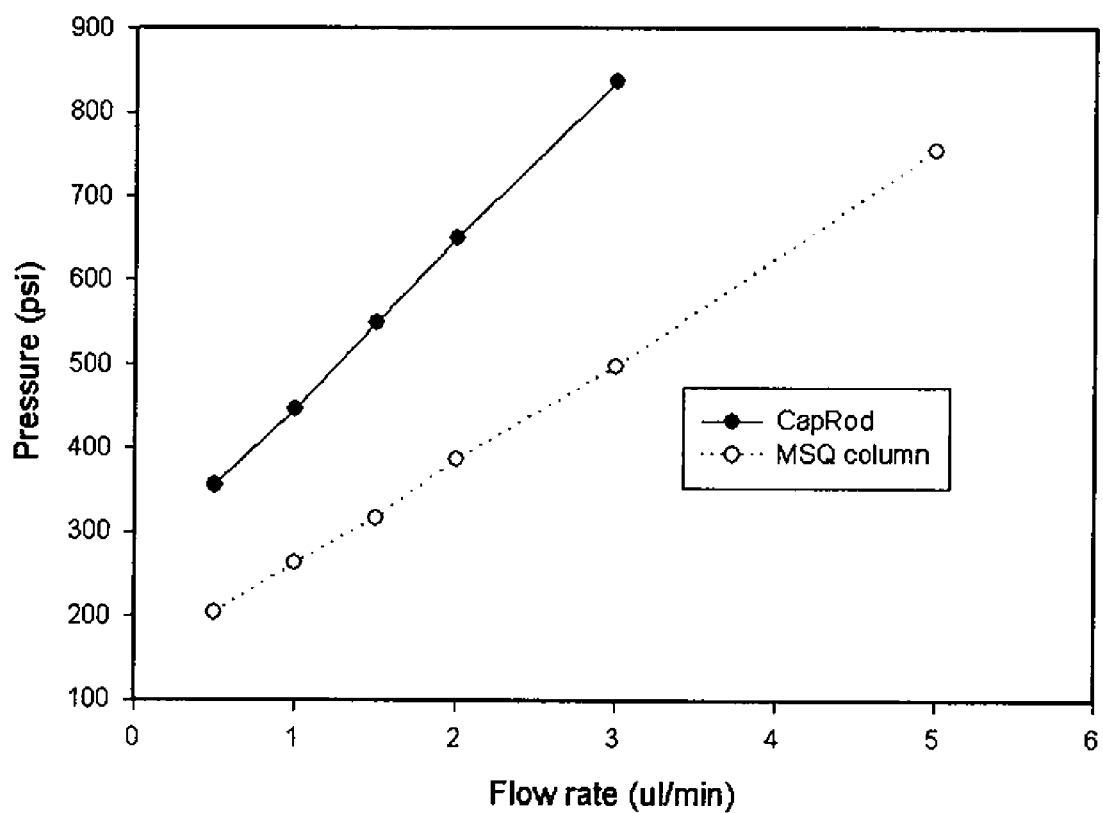
FIG. 20 shows plots of column backpressure against flow rate of mobile phase. Mobile phase: 80% methanol. CapRod (length=15 cm, i.d.=100 µm), MSQ column (length=17 cm, i.d.=100 µm).

FIG. 20 shows the effects of flowrate on backpressure for a commercially available Caprod monolithic column (closed symbols) and for the monolithic MSQ column (open symbols). The data clearly show that the MSQ columns have the expected linear dependence of backpressure on flowrate, but also show approximately half the backpressure of the Caprod column under identical flowrate conditions. These data indicate that more rapid separations may be possible with such columns.

Figure 21:
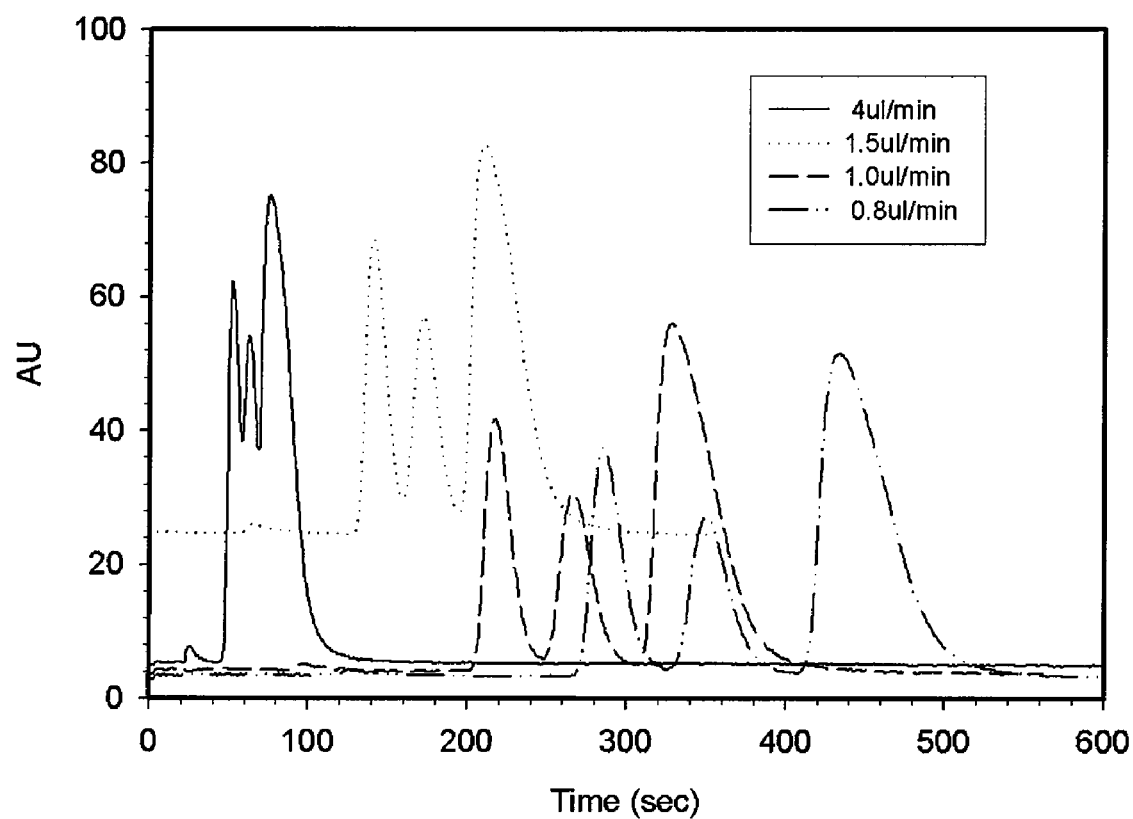
FIG. 21 shows chromatographs obtained for alkylbenzenes $(C_6H_5(CH_2)_nH, n=1-3$. Mobile phase: 80% MeOH. Flow rates: 4, 1.5, 1.0, 0.8 µl/min. MSQ column: length=17 cm, i.d.=100 µm.

FIG. 21 shows preliminary data on the separation of alkylbenzenes using MSQ columns operated at different flowrates. The data show that reasonable separation can be achieved using a flowrate of 1.5 μL/min, with the separation requiring about 5 min. As shown in Table 4, separation efficiency generally increases a flowrate decreases, although this does lead to longer separation times.

While the present invention has been described with reference to the above examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Table 1. Experimental conditions used for formation of various samples.

| Methods | Sample No | Catalysts | Calculated pH[a] | Gelation Time (h) | Comments |
|---|---|---|---|---|---|
| One-step | 1 | 1 M HCl | 0.8 | | pH < IEP |
| | 2 | 0.1 M HCl | 1.8 | | |
| | 3 | 0.01 M HCl | 2.8 | | |
| | 4 | 0.001 M HCl | 3.8 | | pH~IEP |
| | 5 | Water (pH 6.5) | | | |
| | 6 | 0.05 M NH₄OH | 10.6 | | pH > IEP |
| | 7 | 0.1 M NH₄OH | 10.7 | | |
| | 8 | 1 M NH₄OH | 11.2 | 5.1 | |
| Two-step | 9 | 0.01 M HCl + 1 M NH₄OH | 3.1 + 11.1[b] | 18.1 | pH < IEP in step one, |
| | 10 | 0.05 M HCl + 1 M NH₄OH | 2.3 + 10.6 | 9.4 | pH > IEP in step two |
| | 11 | 0.1 M HCl + 1 M NH₄OH | 2.1 + 10.3 | 17.2 | |

[a] calculated pH assumes no effect from added ethanol on the pKa of the catalyst, but does not account for dilution effects arising from all constituents in the mixture;
[b] The first number refers to the pH of solution during the initial 1 h acidic step, the second number refers to the final pH of solution after addition of base in the second step.

TABLE 2

Table 2. Specific Surface Area (SSA, m²/g) and Total Pore Volume (TPV, cm³/g) of MSQ Gels processed at different temperatures.

| Sample No | 200° C. SSA/TPV | 300° C. SSA/TPV | 400° C. SSA/TPV | 450° C. SSA/TPV |
|---|---|---|---|---|
| 8 | 420/0.60 | 422/0.53 | 370/0.41 | 101/0.20 |
| 9 | 210/0.27 | 199/0.25 | 150/0.19 | 37/0.05 |
| 10 | 508/0.51 | 463/0.45 | 336/0.33 | 199/0.24 |
| 11 | 510/0.74 | 505/0.66 | 425/0.58 | 244/0.34 |

TABLE 3

Surface area and total pore volume of MSQ monoliths formed using different durations of the acidic step

| $t_d$ (hrs) | Surface area (m²/g) | Pore volume (cc/g) |
|---|---|---|
| 1 | 418.2 ± 10.1 | 0.67 ± 0.16 |
| 4 | 296.5 ± 7.4 | 0.29 ± 0.11 |
| 5 | 59.3 ± 11.5 | 0.12 ± 0.04 |

TABLE 4

Effect of flow rate on column performances

| | Plate number | |
|---|---|---|
| Flow Rate (μl/min) | Toluene | Ethylbenzene |
| 0.8 | 6135 | 5747 |
| 1 | 4982 | 5106 |
| 1.5 | 3676 | 4306 |
| 4 | 10700 | 1141 |

Full Citations for Documents Referred to in the Specification

[1]. Baney, R. H.; Itoh, M.; Sakakibara, A.; Suzuki, T. Silsesquioxanes. *Chem. Rev.* 1995, 95, 1409-1430.

[2]. Perry, R. J.; Adams, M. E. TOSPEARL: silicone resin for industrial applications. In *Silicones and Silicone-Modified Materials*, Clarson, S. J.; Fitzgerald, J. J.; Owen, M. J.; Smith, S. D. Ed. American Chemical Society: Washington D.C., 2000, 728, p. 533-543.

[3]. Voronkov, M. G.; Lavrent'yev, V. I. Polyhedral oligosilsesquioxanes and their homo derivatives. *Topics Curr. Chem.* 1982, 102, 199-236.

[4]. (a) Nguyen, C. V.; Kenneth, R. C.; Hawker, C. C.; Hedrick, J. L.; Jaffe, R. L; Miller, R. D.; Remenar, J. F.; Rhee, H-W; Rice, P. M.; Toney, M. F.; Trollasa, M.; Yoon, D. Y. Low-Dielectric, Nanoporous Organosilicate Films Prepared via Inorganic/Organic Polymer Hybrid Templates. Nanoporous Ultralow Dielectric Constant Organosilicates Templated by Triblock Copolymers. *Chem. Mater.* 1999, 11, 3080-3085. (b) Yang, S.; Mirau, P. A., Pai, C-S; Nalamasu, O; Reichmanis, E.; Pai, J. C.; Obeng, Y. S.; Seputro, J.; Lin, E. K.; Lee, H-J.; Sun, J.; Gidley, D. W. Chem. Mater. 2002, 14, 369-374. (c) Xu, J.; Moxom, J.; Yang, S.; Suzuki, R.; Ohdaira, T. Porosity in porous methyl-silsesquioxane (MSQ) films. *Applied Surf Sci.* 2002, 194, 189-194.

5. Kanamori, K.; Yonezawa, H.; Nakanishi, K.; Hirao, K.; Jinnai, H. Structural formation of hybrid siloxane-based polymer monolith in confined spaces. *J. Sep. Sci.* 2004, 27, 874-886.

6. (a) Shirtcliffe, N. J.; McHale, G.; Newton, M. I.; Perry, C. C. Intrinsically Superhydrophobic Organosilica Sol-Gel Foams. *Langmuir*, 2003, 19, 5626-5631. (b) Rao, A. V.; Kulkarni, M. M.; Amalnerkar, D. P.; Seth, T. *J. Superhydrophobic silica aerogels based on methyltrimethoxysilane precursor. Non-Cryst. Solids* 2003, 330, 187-195.

7. (a) Onda, T.; Shibuichi, S.; Satoh, N.; Tsujii, K. Super-Water-Repellent Fractal Surfaces. *Langmuir* 1996, 12, 2125-2127. (b) Oener, D.; McCarthy, T. J. Ultrahydrophobic Surfaces. Effects of Topography Length Scales on Wettability. *Langmuir* 2000, 16, 7777-7782. (c) Fuji, M.; Fujimori, H.; Takei, T.; Watanabe, T.; Chikazawa, M. Wettability of Glass-Bead Surface Modified by Trimethylchlorosilane. *J. Phys. Chem.* 1998, B102, 10498-10504. (d) Han, J. T.; Lee, D. H.; Ryu, C. Y.; Cho, K. Fabrication of Superhydrophobic Surface from a Supramolecular Organosilane with Quadruple Hydrogen Bonding. *J. Am. Chem. Soc.* 2004, 126(15), 4796-4797. (e) Shiu, J.-Y.; Kuo, C.-W.; Chen, P.; Mou, C.-Y. Fabrication of Tunable Superhydrophobic Surfaces by Nanosphere Lithography. *Chem. Mater.* 2004, 16, 561-564.

8. (a) Reetz, M. T.; Tielmann. P.; Wiesenhofer, W.; Konen, W.; Zonta, A Second generation sol-gel encapsulated lipases: Robust heterogeneous biocatalysts. *Adv. Synth. Catal.* 2003, 345, 717-728. (b) El Rassy, H.; Perrard, A.; Pierre, A. C. Application of lipase encapsulated in silica aerogels to a transesterification reaction in hydrophobic and hydrophilic solvents: Bi-Bi Ping-Pong kinetics. *J. Mol. Catal. B. Enzymat.* 2004, 30, 137-150. (c) Reetz, M. T.; Zonta, A.; Simpelkamp, J. Efficient heterogeneous biocatalysts by entrapment of lipases in hydrophobic sol-gel materials. *Angew. Chem., Int. Ed. Engl.* 1995, 34, 301-304.

9. Dong, H.; Lee, M-H.; Thomas, R. D.; Zhang, Z.; Reidy, R. F.; Mueller, D. W.; Methyltrimethoxysilane Sol-Gel Polymerization in Acidic Ethanol Solutions Studied by 29Si NMR Spectroscopy. *J Sol-Gel Sci. Techn.* 2003, 28, 5-14.

10. (a) Smith, K. A., Polycondensation of Methyltrimethoxysilane. *Macromolecules* 1987, 20, 2514. (b) Alam, T. M.; Assink, R. A.; Loy, D. A. Hydrolysis and Esterification in Organically Modified Alkoxysilanes: A $^{29}$Si NMR Investigation of Methyltrimethoxysilane. *Chem. Mater.* 1996, 8, 2366-2374.

11. (a) Takamura, N.; Gunji, T.; Hatano, H.; Abe, Y. Preparation and properties of polysilsesquioxanes: Polysilsesquioxanes and flexible thin films by acid-catalyzed controlled hydrolytic polycondensation of methyl- and vinyltrimethoxysilane. *J. Polym. Sci. Part A: Polym. Chem.* 1999, 37, 1017-1026. (b) Lee, J. K.; Char, K. C.; Rhee, H. W.; Ro, H. W.; Yoo, D. Y.; Yoon, D. Y. Synthetic control of molecular weight and microstructure of processible poly(methylsilsesquioxane)s for low-dielectric thin film applications. *Polymer* 2001, 42, 9085-9089. (c) Lee, L. H.; Chen, W. C.; Liu, W. C. Structural control of oligomeric methyl silsesquioxane precursors and their thin-film properties. *J. Polym. Sci. Part A: Polym. Chem.* 2002, 40, 1560-1571. (d) Sugahara, Y.; Okada, S.; Sato, S.; Kuroda, K.; Kato, C. $^{29}$Si—NMR study of hydrolysis and initial polycondensation processes of organoalkoxysilanes. II. Methyltriethoxysilane. *J. Non-Cryst. Solids* 1994, 167, 21-28.

12. (a) Devereux, F.; Boilot, J. P.; Chaput, F. Lecomte, A. Sol-gel condensation of rapidly hydrolyzed silicon alkoxides: a joint silicon-29 NMR and small-angle x-ray scattering study. *Phys. Rev. A* 1990, 41, 6901-6909. (b) Brunet, F. Polymerization reactions in methyltriethoxysilane studied through $^{29}$Si NMR with polarization transfer. *J. Non-Cryst. Solids* 1998, 231, 58-77. (c) Rankin, S. E.; Macosko, C. W.; McCormick, A. V. Sol-gel polycondensation kinetic modeling: methylethoxysilanes. *IChE Journal*, 1998, 44, 1141-1156.

13. (a) Zhang, Z.; Wakabayashi, H.; Tanigami, Y.; Terai, R. Enhancement of polymerization in $CH_3SiO_{3/2}$ coating film by gaseous amines. *Thin Solids Films* 1999, 349, 24-28. (b) Haruvy, Y.; Heller, A.; Webber, S. E. Sol-gel preparation of optically clear supported thin-film glasses embodying laser dyes. Novel fast method. In *Supermolecular Architecture*, American Chemical Society: Washington D.C., 1992, p. 405-424.

14. Loy, D. A.; Baugher, B. M.; Baugher, C. R.; Schneider, D. A.; Rahimian, K. Substituent Effects on the Sol-Gel Chemistry of Organotrialkoxysilanes. *Chem. Mater.* 2000, 12, 3624-3632.

15. Loy, D. A.; Mather, B.; Straumanis, A. R.; Baugher, C.; Schneider, D. A.; Sanchez, A.; Shea, K. J. Effect of pH on the Gelation Time of Hexylene-Bridged Polysilsesquioxanes. *Chem. Mater.* 2004, 16, 2041-2043.

16. Motokawa, M.; Kobayashi, K.; Ishizuka, N.; Minakuchi, H.; Nakanishi, K.; Jinnai, H.; Hosoya, K.; Ikegami, T.; Tanaka, N. Monolithic silica columns with various skeleton sizes and through-pore sizes for capillary liquid chromatography. *J. Chromatogr. A.* 2002, 961, 53-63.

17. Barrett, E. P.; Joyner, L.; Halenda, P. P. The Determination of Pore Volume and Area Distributions in Porous Substances. I. Computations from Nitrogen Isotherms. *J. Am. Chem. Soc.* 1951, 73, 373-380.

18. Pohl, E. R.; Osterholtz, F. D. Kinetics and mechanism of aqueous hydrolysis and condensation of alkyltrialkoxysilanes. In *Molecular Characterization of Composite Interfaces; Ishida, H., Kuma, G., Eds; Plenum: New York*, 1985, p 157-170.

19. Shea, K. J.; Loy, D. A. Bridged polysilsesquioxanes: Molecular engineering of hybrid organic-inorganic materials. *MRS Bull.* 2001, 26, 368-376.

20. (a) Iler, R. K. The Chemistry of silica; Wiley: New York, 1979. (b) Brinker, C. J.; Scherer, G. W. *Sol-Gel Science The Physics and Chemistry of Sol-Gel Processing*, Academic Press: New York, 1990. (c) Osterholtz, F. D.; Pohl, E. R. Kinetics of the hydrolysis and condensation of organofunctional alkoxysilanes: a review. *J Adhesion Sci. Technol.* 1992, 6, 127-149.

21. Sefčík, J.; McCormick, A. V. Kinetic and thermodynamic issues in the early stages of sol-gel processes using silicon alkoxides. *Catalysis Today* 1997, 35, 205-223.

22. Loy, D. A.; Carpenter, J. P.; Alam, T. M.; Shaltout, R.; Dorhout, P. K.; Greaves, J.; Small, J. H.; Shea, K. J. Cyclization Phenomena in the Sol-Gel Polymerization of α,ω-Bis(triethoxysilyl)alkanes and Incorporation of the Cyclic Structures into Network Silsesquioxane Polymers *J. Am. Chem. Soc.* 1999, 121, 5413-5423.

23. Lipp, E. D.; Smith, A. L. Infrared, Raman, near-infrared, and ultraviolet spectroscopy. in *The Analytical Chemistry of Silicones*, Ed. Smith, A. L. John Wiley & Sons: New York, 1991, pp. 305-344.

24. Vogt, L. H. Jr.; Brown, J. F. Jr. Crystalline methylsilsesquioxanes. *Inorg Chem.* 1963, 2, 189-192.

25. Smith, A. L. Infrared spectra of organosilicon compounds in the CsBr region. *Spectrochemica Acta*, 1963, 19, 849-862.

26. Matějka, L.; Dukh, O.; Hlavatá, D.; Meissner, B.; Brus, J. Cyclization and Self-Organization in Polymerization of Trialkoxysilanes. *Macromolecules* 2001, 34, 6904-6914.

27. Rankin, S. E.; McCormick, A. V. 29Si NMR study of base-catalyzed polymerization of dimethyldiethoxysilane. *Magn. Reson. Chem.* 1999, 37, S27-S37.

28. (a) Zhang, Z.; Wakabayashi, H. Insight into Mechanical Properties of CH3SiO3/2 Film. *J. Sol-Gel Sci. Techn.* 2000, 19, 171-174.

29. Brinker, C. J.; Keefer, K. D.; Scharfer, D. W.; Ashley, C. S. Sol-gel transition in simple silicates. *J. Non-Cryst. Solids* 1982, 48, 47-64.

30. Boonstra, A. H.; Bernards, T. N. M. The dependence of the gelation time on the hydrolysis time in a two-step $SiO_2$ sol-gel process. *J. Non-Cryst. Solids* 1988, 105, 207-213.

31. Sing, K. S. W.; Everett, D. H.; Haul, R. A. W.; Moscou, L.; Pieritti, R. A.; Rouquerol, J.; Siemieniewska, T. Reporting physisorption data for gas/solid systems with special reference to the determination of surface area and porosity (Recommendations 1984). *Pure Appl. Chem.* 1985, 57, 603-619.

32. Fidalgo, A.; Emilia Rosa, M.; Ilharco, L. M. Chemical Control of Highly Porous Silica Xerogels: Physical Properties and Morphology. *Chem. Mater.* 2003, 15, 2186-2192.

33. Nakanishi, K. Pore Structure Control of Silica Gels Based on Phase Separation. *J. Porous Mater.* 1997, 4, 67-112.

34. Cabrera, K. Applications of silica-based monolithic HPLC columns. *J Sep. Sci.* 2004, 27, 843-852.

35. (a) Kamiya, K.; Yoko, T.; Tanaka, K.; Takeuchi, M. Thermal evolution of gels derived from $CH_3Si(OC_2H_5)_3$ by the sol-gel method. *J. Non-Cryst. Solids* 1990, 121, 182-187. (b) Abe, Y.; Kagayama, K.; Takamura, N.; Gunji, T.; Yoshihara, T.; Takahashi, N. Preparation and properties of polysilsesquioxanes. Function and characterization of coating agents and films. *J. Non-Cryst. Solids* 2000, 261, 39-51.

36. Cheng, Y-F, Walter, T. H.; Lu, Z.; Iraneta, P., Alden, B, A.; Gendreau, C.; Neue, U. D.; Grassi, J. M.; Carmody, J. L.; O'Gara, J. E.; Fisk, R. P. Hybrid organic-inorganic particle technology: Breaking through traditional barriers of HPLC separations. *LC/GC* 2000, 18, 1162-1172.

37. Wyndham, K. D.; O'Gara, J. E.; Walter, T. H.; Glose, K. H.; Lawrence, N. L.; Alden, B. A.; Izzo, G. S.; Hudalla, C. J.; Iraneta, P. C. Characterization and Evaluation of $C_{18}$ HPLC Stationary Phases Based on Ethyl-Bridged Hybrid Organic/Inorganic Particles. *Anal. Chem.* 2003, 75, 6781-6788.

38. Nakanishi, K.; Takahashi, R.; Nagakane, T.; Kitayama, K.; Koheiya, N.; Shikata, H.; Soga, N. Formation of Hierarchical Pore Structure in Silica Gel *J. Sol-Gel Sci. Techn.* 2000, 17, 191-210.

39. Smith, D. M.; Stein, D.; Anderson, J. M.; Ackerman, W. Preparation of low-density xerogels at ambient pressure. *J. Non-Cryst. Solids* 1995, 186, 104-112.

40. (a) Kistler, S. S. Coherent expanded aerogels and jellies. *Nature* 1931, 127, 741. (b) Tewari, P. H.; Hunt, A. J.; Lofftus, K. D. Ambient-temperature supercritical drying of transparent silica aerogels. *Mater. Lett.* 1985, 3, 363-367.

41. Smith, D. M.; Deshpande, R.; Brinker, C. J. Preparation of low-density aerogels at ambient pressure. *Mater. Res. Soc. Symp. Proc.* 1992, 271.567-572.

42. Haereid, S.; Dahle, M.; Lima, S.; Einarsrud, M.-A. Preparation and properties of monolithic silica xerogels from TEOS-based alcogels aged in silane solutions. *J Non-Cryst. Solids* 1995, 186, 96-103.

43. Schwertfeger, F.; Frank, D.; Schmidt, M. Hydrophobic waterglass based aerogels without solvent exchange or supercritical drying. *J. Non-Cryst. Solids* 1998, 225, 24-29.

44. Land, V. D.; Harris, T. M.; Teeters, D.C. Processing of low-density silica gel by critical point drying or ambient pressure drying. *J Non-Cryst. Solids* 2002, 283, 11-17.

45. Velev, O. D.; Lenhoff. A. M. Colloidal crystals as templates for porous materials. *Curr. Opin. Coll. Interface Sci.* 2000, 5, 56-63.

46. Oh, W.; Ree, M. Anisotropic Thermal Expansion Behavior of Thin Films of Polymethylsilsesquioxane, a Spin-on-Glass Dielectric for High-Performance Integrated Circuits. *Langmuir* 2004, 20, 6932-6939, and references therein.

47. (a) Pirard, R.; Blacher, F.; Pirard, J. P. *J. Mater. Res.* Interpretation of Mercury Porosimetry Applied to Aerogels. 1995, 10, 2114-2119. (b) Scherer, G. W.; Smith, D. M.; Qiu, X.; Anderson, J. Compression of Aerogels. *J. Non-Cryst. Solids,* 1995, 186, 316-320.

48. Duffours, L.; Woignier, T.; Phalippou, J. Irreversible volume shrinkage of silica aerogels under isostatic pressure. *J. Non-Cryst. Solids* 1996, 194, 283-290.

49. (a) Peeters, M. P. J. Wakelkamp, W. J. J.; Kentgens, A. P. M. A $^{29}Si$ solid-state magic angle spinning nuclear magnetic resonance study of TEOS-based hybrid materials. *J. Non-Cryst. Solids* 1995, 189, 77-87. (b) Glaser, C. A.; Wolkes, G. L.; Bronniman, C. E. Solid-state $^{29}Si$ NMR of TEOS-based multifunctional sol-gel materials. *J. Non-Cryst. Solids* 1989, 113, 73-89.

We claim:

1. A two-step method of preparing methylsilsesquioxane (MSQ) materials suitable for chromatographic applications comprising treating a MSQ precursor with a suitable acid followed by treatment with a suitable base and controlling one or more of the reaction conditions selected from the group consisting of:
   (a) acid concentration;
   (b) time of acid treatment; and
   (c) total concentration of water,
to provide a gelation time that is less than the phase separation time to form a MSQ monolith suitable for chromatographic applications;
   wherein the MSQ material is loaded into a chromatographic column before gelation occurs.

2. The method according to claim 1, wherein the MSQ precursor has the general formula Me-Si—(OR)$_3$, wherein —OR is a group that may be hydrolyzed under acidic or basic conditions to provide free OH groups that may be polycondensed to form MSQ materials.

3. The method according to claim 2, wherein the MSQ precursor is methyltrimethoxysilane or methyltriethoxysilane.

4. The method according to claim 1, wherein the acid is selected from hydrochloric acid, nitric acid, sulphuric acid, hydrobromic acid and phosphoric acid.

5. The method according to claim 4, wherein the acid is hydrochloric acid.

6. The method according to claim 1, wherein the base is selected from ammonia, ammonium hydroxide, potassium hydroxide, sodium hydroxide, lithium hydroxide, calcium hydroxide, magnesium hydroxide and barium hydroxide.

7. The method according to claim 6, wherein the base is ammonium hydroxide.

8. The method according to claim 1, wherein said reaction conditions control the morphology of the MSQ materials including porosity, shrinkage and/or springback.

9. The method according to claim 1, wherein the concentration of the acid is in the range of about 0.01 M to about 1 M.

10. The method according to claim 1, wherein the precursor is treated with the acid for a time period of about 2 hours to about 6 hours.

11. The method according to claim 1, wherein the column is a capillary column.

12. The method according to claim 11, wherein the column is heated to remove solvents and to densify the MSQ material after the material is loaded.

13. The method according to claim 1, wherein the material is derivatized with a suitable organosilane reagent to modify the surface properties of pores in the column.

14. A chromatographic column prepared using the method according to claim 1.

15. A method of separating one or more compounds from a mixture comprising applying the mixture to a chromatographic column according to claim 14 and separating the one or more compounds.

* * * * *